United States Patent [19]

Marshall

[11] Patent Number: 4,633,142

[45] Date of Patent: Dec. 30, 1986

[54] MULTIBEAM GRAPHIC DISPLAY SYSTEM UTILIZING BIT MAPPING MEMORY

[75] Inventor: J. Nathaniel Marshall, Boston, Mass.

[73] Assignee: Honeywell Information Systems Inc., Waltham, Mass.

[21] Appl. No.: 537,760

[22] Filed: Sep. 30, 1983

[51] Int. Cl.[4] ........................ G06K 15/20; H01J 31/16

[52] U.S. Cl. .................................... 315/365; 340/720; 340/744

[58] Field of Search ................ 315/365; 340/748, 744, 340/720

[56] References Cited

U.S. PATENT DOCUMENTS

| | | | |
|---|---|---|---|
| 2,862,144 | 11/1958 | McNaney | 340/720 |
| 4,338,597 | 7/1982 | Steiner et al. | 340/744 |
| 4,353,061 | 10/1982 | Beck | 315/365 |
| 4,356,482 | 10/1982 | Oguchi | 340/744 |
| 4,560,981 | 12/1981 | Jackson et al. | 340/744 |

*Primary Examiner*—Theodore M. Blum

*Attorney, Agent, or Firm*—Nicholas Prasinos; John S. Solakian

[57] ABSTRACT

A high definition bit mapped page display system for graphics and text utilizing multiple beams in a CRT is disclosed. Information for the several lines which are written simultaneously is made available in parallel. The invention is described in terms of a character set and text generation, but the same principles apply to any other graphic or bit map and to storage in ROMs or loadable RAMs. Eah beam of a multiple CRT tube is biased to generate a portion of a character or graphic as it scans across the tube. It takes 12 lines to scan a character with a N-beam tube, 12 over N character scans are therefore required. With the same scanning speed as with a single beam, this factor can be used to increase definition (i.e. number of lines). The invention utilizes CRTs with shaped electron beams, a bit map for storing bits utilized for generating bit patterns which are used to control the shaped electron beams.

11 Claims, 28 Drawing Figures

SHEET 1 of 2

SHEET 2 of 2

SHEET 1 of 4

SHEET 2 of 4

SHEET 3of4

SHEET 4 of 4

| PASS | STARTING ADDRESS | NO. OF SCAN LINES |
|---|---|---|
| 1 | 1920 | 16 |
| 2 | 1792 | 15 |
| 3 | 1664 | 14 |
| 4 | 1536 | 13 |
| 5 | 1408 | 12 |
| 6 | 1280 | 11 |
| 7 | 1152 | 10 |
| 8 | 1024 | 9 |
| 9 | 896 | 8 |
| 10 | 768 | 7 |
| 11 | 640 | 6 |
| 12 | 512 | 5 |
| 13 | 384 | 4 |
| 14 | 256 | 3 |
| 15 | 128 | 2 |
| 16 | 0 | 1 |

FIG. 12

LOGIC FOR GENERATING DEFLECTION BIT PAIRS
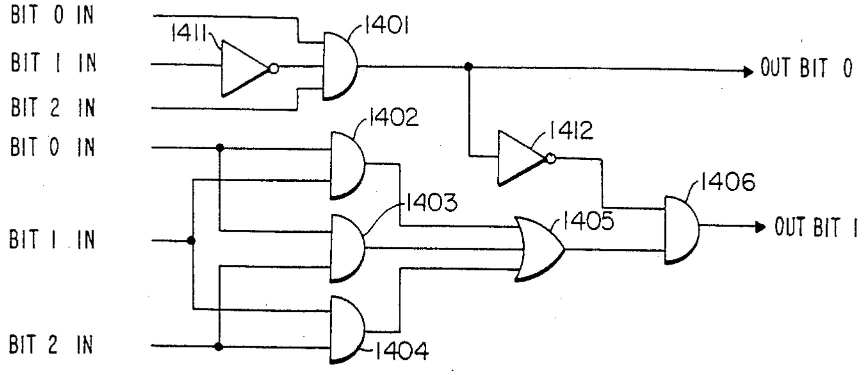
FIG. 14A
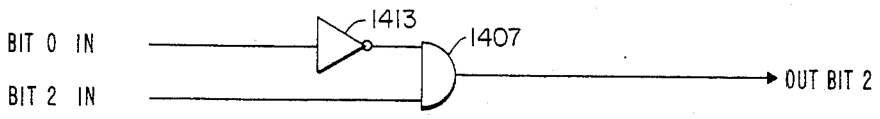
FIG. 14B
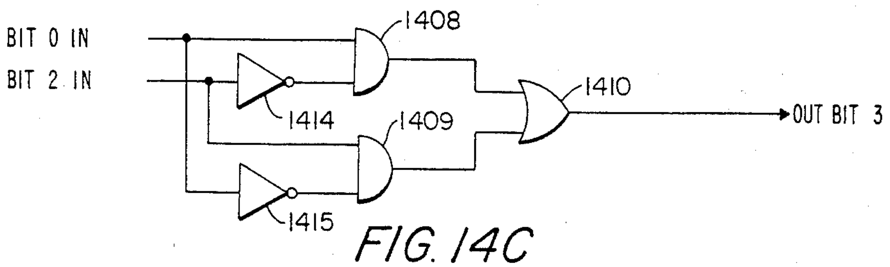
FIG. 14C
TRUTH TABLE
| BIT PATTERN FOR THREE VERTICAL SPOTS | PAIR 1 X | PAIR 2 Y |
|---|---|---|
| 001 | 1 1 | 0 1 |
| 010 | 1 1 | 1 0 |
| 011 | 1 0 | 0 1 |
| 100 | 1 1 | 1 1 |
| 101 | 0 1 | 1 0 |
| 110 | 1 0 | 1 1 |
| 111 | 1 0 | 1 0 |
FIG. 15A
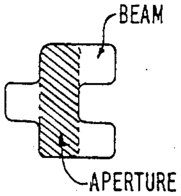
FIG. 15B

MULTIBEAM GRAPHIC DISPLAY SYSTEM UTILIZING BIT MAPPING MEMORY

RELATED APPLICATIONS

The following applications are incorporated by reference to the present application.

1. "Multiple Beam High Definition Page Display", invented by Thomas O. Holtey and J. Nathaniel Marshall, filed on Sept. 30, 1983, having U.S. Ser. No. 537,929, and assigned to the same assignee named herein.

2. "Cathode Ray Tube (CRT) Having Shaped Beams", invented by J. Nathaniel Marshall, filed on Sept. 30, 1983, having U.S. Ser. No. 537,759, and assigned to the same assignee named herein.

BACKGROUND OF THE INVENTION

1. Field of the Invention

This invention relates in general to computer systems and more particularly to a means and a method for generating high definition characters and diagrams utilizing a multiple beam cathode ray tube.

2. Description of the Prior Art

The character generator is the means for translating from the character code associated with a particular character to be displayed on a cathode ray tube to the dot pattern for that particular character. In order to achieve suitable speeds, character generators are usually implemented in hardware using a table look-up scheme with a table stored in a dedicated memory, usually a ROM/PROM with the character code serving as a portion of the address to the memory.

There are various methods for character generation. No prior art search has been made by the applicants. However, in a recent decision by the U.S. District Court for the District of Delaware regarding litigation of the Cole Patent (U.S. Pat. No. 3,345,458, Master File Docket Number 78-198), the Court opinion provides the following review of the technology. The description is character oriented, but would apply to any graphic.

"An Overview of the Technology"

"In designing a system for receiving digital coded data and displaying it in decoded form on a Cathode Ray Tube (CRT), there are certain parameters that must be considered. Among these are:

"1. The type of scan pattern. The two types of primary concern here include one in which the scan covers one character space at a time (a miniature raster scan pattern), and one in which each line of the scan covers a horizontal slice of each character in a row, as the beam scans across the entire width of a CRT screen (television raster scan pattern).

"2. The type of CRT. The two principle types being the memory tube, which can hold a picture for minutes, and the non-memory type (including those with high persistence phosphers), of which a TV tube is an example, that needs to be 'refreshed' at a sufficient rate to make the picture appear continuous.

"4. Storage. A storage or memory is required in a system employing a non-memory CRT because the video signal must be applied to the CRT a number of times a second. The memory may, however, be either one that stores the character code prior to decoding or one that stores the video bits produced by the translation process. When the former is used, the system is sometimes characterized as an 'on-the-fly' system, to indicate that the video bits are applied to the input of the CRT as each one is generated by the translator in contrast to a system that has storage of the video bits.

"Each type of raster scan pattern has its advantages and disadvantages. An advantage of the minature raster scan over the TV raster scan is that the character code may be presented at a slower rate for the same number of characters per row and rows per screen.

"The two main advantages in using a TV scan are the cost saving in the display portion of the system (the CRT and deflection circuits), and the ability to superimpose characters on pictures or other video (such as maps, etc.). These advantages generally come into play, however, only if one can operate at speeds at least equal to 'commercial' or 'entertainment' TV rates. Then one can buy a mass produced off the shelf display system relatively inexpensively, or simply transmit messages to TV sets that are already being used for other purposes, also mix character signals with other video signals operating at commercial TV rates. At least the first advantage is lost, hosever, if the cost of producing character video signals at commercial TV rates exceed the cost saving in the display portion.

"As the beam of the CRT scans, the information controlling on/off condition of the beam must be synchronized with the beam scan. This is true whether the beam follows TV scan pattern or a minature scan pattern. If, however, the TV scan pattern is to operate at commercial TV rates, or faster, the requirement of synchronization means that the electronic components must work at rates which were prohibited in the 1950's and too expensive to be commercial through the early 1960's.

"The coded form of input data must be translated to video data to control the on/off condition of the beam of the CRT as it sweeps in a miniraster or TV raster scan. The patent literature from the 1950's discloses translators in the form of digital circuits, for translating from a 6-bit character code to a pulse train which will display a 5 by 7 character matrix on a CRT. These are shown in U.S. Pat. No. 2,920,312 by Gordon and U.S. Pat. No. 2,987,715 by Jones.

"All of the character display CRT systems of interest here use signal storage, so that the CRT screen can be repeatedly 'refreshed'. Thus, a full screen of character-representing signals (sometimes called a 'page') is stored and used repeatedly to 'refresh' the screen. The storage is either of two types. The first type involves storing the 6-bit character codes that are received. The codes can then be read out from storage, and translated to the video signal, as the CRT beam is scanning. The second type of storage involves translating the 6-bit character codes, as they are received, to their corresponding video signals and then moving the video bits. The video bits can then be read out from storage to the CRT as the CRT beam is scanning. While both of these storage approaches involve the storage of codes, and both codes are generally binary in nature and represent characters, they can be conveniently referred to as 'character code storage' and 'video bit storage' respectively.

"The disadvantage of video bit storage is that it takes more storage space, since it must store a screen of page or page of 35-bit character matrix codes—while the character code storage needs only a screen or page of 6-bit character codes. The advantage of video bit storage, however, is that the character codes are only translated once, and the video bits are then stored and read out concurrently with a beam scan—so that the character codes need not be translated concurrently with each scan of a scan line and, therefore, the translation need not keep pace with the high-speed beam scan. Further, video-bit storage is particularly suited to the variable placement of the characters on the screen."

As noted supra the advantage of the raster scan technique of generating characters by digital techniques comes into play only if one can operate at speeds at least equal to commercial or entertainment TV rates. This requirement is met in the prior art by utilizing ROM/-PROMs to achieve the speed.

However there is still another limitation in generating characters on a CRT and that is the decay of the phosphors on a cathode ray tube in a certain fixed period regardless of how big the screen is. Hence, there is a limitation as to the size of the screen and the number of characters that can be accommodated on a screen with any reasonable definition. For example, present-day screens accommodate about 2000 characters. Generally there are 25 rows, each row having 80 characters. Additionally each row requires 12 scan lines for each character. In order to paint the entire 2000 characters on a CRT 1/60th of a second is required. Accordingly the phosphor decay must be less than this time; i.e., the screen must be illuminated for at least this time before being refreshed, otherwise the message will disappear. One technique of painting more characters or providing greater definition is to speed up the CRT beam. However, if this is done, more bits have to be accessed from memory in order to keep pace with the faster beam and all the components in the video and deflection system become more expensive and more difficult to adjust. Low cost memories cannot be accessed fast enough per unit time; and accordingly any attempt to increase the detail on of the screen or the number of characters is limited by today's technology. This invention overcomes these limitations.

Accordingly the problem of utilizing a larger screen with more detail, or more characters, or providing more detail to the characters is a physical problem of getting sufficient bits per unit time to bias the CRT beam and moving the CRT beam with the skew, precision and brightness which is required.

The instant invention overcomes these problems by utilizing a multiple gun assembly for generating multiple beams and a multiple character generator—one for each beam utilized. Hence larger physical areas of the screen can be covered at a given time, so that it is not necessary to access data completely serially and thus exceed the capabilities of the circuitry involved. Accordingly more of the character is painted per unit time and thus there is no necessity to either speed up the beam or the accessing of characters per unit time.

OBJECTS OF THE INVENTION

It is an object of the invention, therefore, to provide an improved character display system.

It is another object of the invention to provide an improved bit-mapped display system utilizing a multi-cathode multi-beam and/or shaped beam cathode ray tube as a display.

It is still another object of the invention to provide an improved bit-mapped display system.

It is still a further object of the invention to provide an improved bit-mapped display system utilizing a shaped beam cathode ray tube (CRT).

A further object of the invention is to provide an improved display system for business graphics.

A still further object of the invention is to provide an improved multiple beam CRT for use in generating diagrams, graphics and images.

These and other objects of the invention will become obvious upon a reading of the specification, together with the drawings.

SUMMARY OF THE INVENTION

The multiple beam or shaped beam page display system of the invention utilizes a bit map with CRTs having shaped electron beams. The bit map is used to generate bit-pairs that are utilized to control the shaped electron beams.

A preferred embodiment utilizes CRTs having shaped electron beams, and a bit map for storing bits that are utilized to generate bit patterns that are applied to the electron beam control means that control the deflection and its magnitude.

An address register is utilized to address the bit map and a read sequence is executed so as to access one word for each of three vertically adjacent lines in such a way that each corresponds to the same horizontal positions along the video raster line. The word accessed is transferred to shift registers and a bit pattern is generated for controlling the shaped beams.

BRIEF DESCRIPTION OF THE DRAWINGS

The manner in which the apparatus of the present invention is constructed and its mode of operation can best be understood in the light of the following detailed description, together with the accompanying drawings in which:

FIG. 12 shows the values used for starting addresses and number of scan line parameters for each of sixteen phases.

FIGS. 14A, 14B and 14C are logic block diagrams of the invention for generating deflection control bits from bit patterns.

FIG. 15A is a truth table which shows the functional results of FIG. 13.

FIG. 15B is a typical aperture and beam to illustrate selected results of the truth table of FIG. 15A.

DETAILED DESCRIPTION OF THE PREFERRED EMBODIMENT

In order to understand the instant invention it is necessary to have an understanding of the formation of a picture on the CRT of a television set. The picture is formed by an electron beam which illuminates various points on the phosphor coating of the screen as it scans the area in which the image is to be displayed. Normally, the beam scans across one horizontal line at a time, starting at the top of the screen and moving sequentially down the screen to the bottom. This pattern of scan in which the beam proceeds across the entire width of the CRT screen before scanning a second horizontal line is referred to as the television raster scan pattern. By using a digital video control signal to appropriately control the intensity of the beam as it traverses the screen, the beam can be used to form a recognizable message or image. Because of its speed, the beam's movement is not detectable by the eye.

Figure 1A:
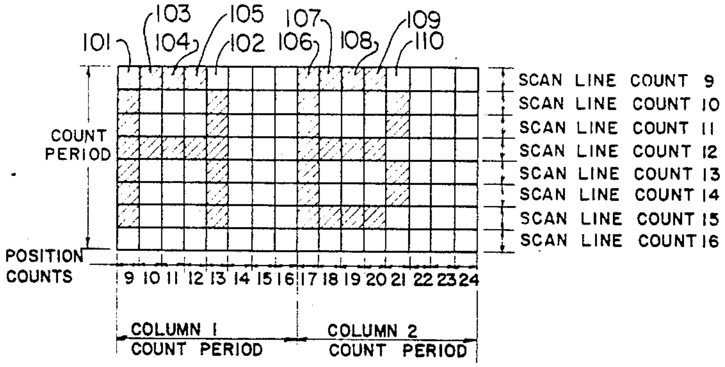
FIG. 1A PRIOR ART
FIGS. 1A and 1B are prior art representations of the methods of generating a character on a CRT utilizing video signals.
Figure 2:
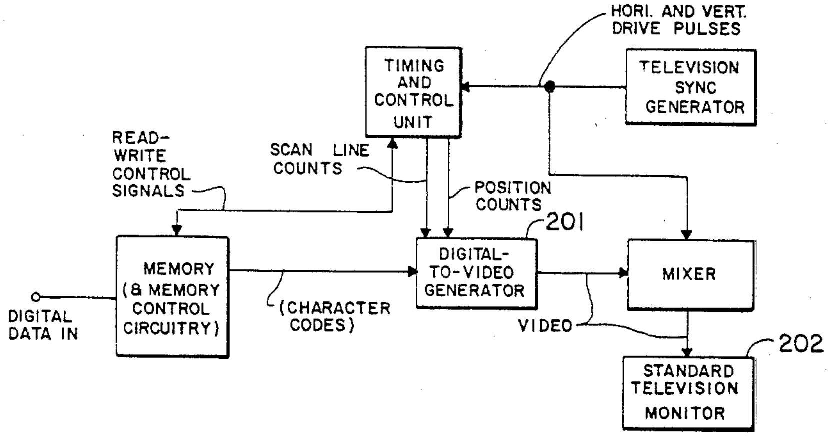
FIG. 2 PRIOR ART
FIG. 2 is a prior art block diagram of the method of generating characters on a CRT utilizing digital signals.

Each character of the set can be represented by an array of dots in a rectangular matrix having fixed dimensions (e.g., 5 dots wide and 7 scan lines high, or as in the instant invention, 7 dots wide and 9 dots high). The character is displayed on the CRT screen within a character space which includes the dot matrix of the character, and additional blank spaces to separate the characters on the screen (e.g. 9 dots wide by 12 scan lines high). Two such adjacent character spaces are shown in prior art FIG. 1A. As the beam moves across the screen in a scan line, the computer codes for each of the characters to be written in a row across the screen are sequentially provided from a memory to a decoder or "character generator". As shown in prior art FIG. 2, timing and control circuitry produce count signals which represent the scan line of the raster and the dot position along the scan line. Character-code information, the scan-line count signal, and the dot position or row count signal are applied to the character generator, labeled Digital to Video Generator 201, which converts the signals into a 2-level, serial digital output. The output signal is applied to the television monitor circuitry 202 as a video signal. One digital level of the signal corresponds to a dot and turns the electron beam on to write a dot on the television screen. The other digital level corresponds to the absence of a dot, and leaves the electron beam turned off so that no dot is written. Dots thus produced as the electron beam moves along a scan line correspond to the dots in the appropriate horizontal slice of each of the characters to be displayed in the character row. Thus in FIG. 1A, dots 103 through 105 (for the character "A") and dots 106 through 109 (for the character "B") will be illuminated sequentially as the electron beam moves along the top scan line. The timing and control circuitry of FIG. 2 also provides horizontal and vertical drive pulses to the monitor 202 to synchronize the scanning motion of the beam with the video signal generated as described supra.

After completing one scan line, the electron beam flies back to the starting side of the screen, (but down one position due to the vertical sweep) to start the next scan line. The sequential application of character codes, scan line count and dot position count is then repeated, this time generating the video signals for the next dot slice of each of the characters in the row.

After the appropriate number of scan lines (e.g., 8 or 12) have been "written" onto the screen, a full row of characters is complete. The entire row has been written onto the screen, one scan line at a time, from top to bottom.

In a like manner, the additional rows of characters making up the message to be displayed on the screen are written. After the entire screen has been scanned, the procedure is repeated at a rate of 60 times per second so as to "refresh" the screen and create a display which the human eye perceives as the persistent, non-flickering image.

Figure 1B:
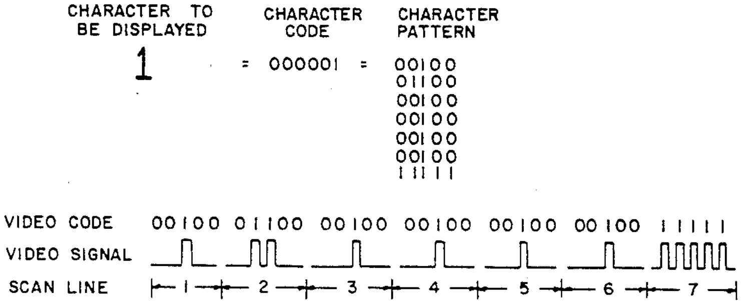
FIG. 1B PRIOR ART

Referring to FIG. 1B, there is an example of the translation of the code for the character "1" which is to be displayed on the screen. It should be noted that if the binary codes that are used for identifying the various characters were supplied directly to the CRT, the pattern on the screen would not generally be recognizable. Thus, the 6-bit code 000111 might represent a number "7", but would appear as 3 dark spots followed by 3 bright spots, or vice versa. Consequently it is necessary to translate the 6-bit binary code into a video signal which will represent a normal appearing character. To see how this is done refer to FIG. 1B which shows the code to pattern translation for the number "1". It should be noted that the video code for the first scan line is 00100 and the video signal which represents this code is a pulse in the position where the dot is to appear. Similarly, for scan line two the video code is 01100 whereby a video signal representing this video code is two pulses causing two dots to appear on scan line two. (When the final scan line is completed, the number "1" appears on the screen.)

Figure 3:
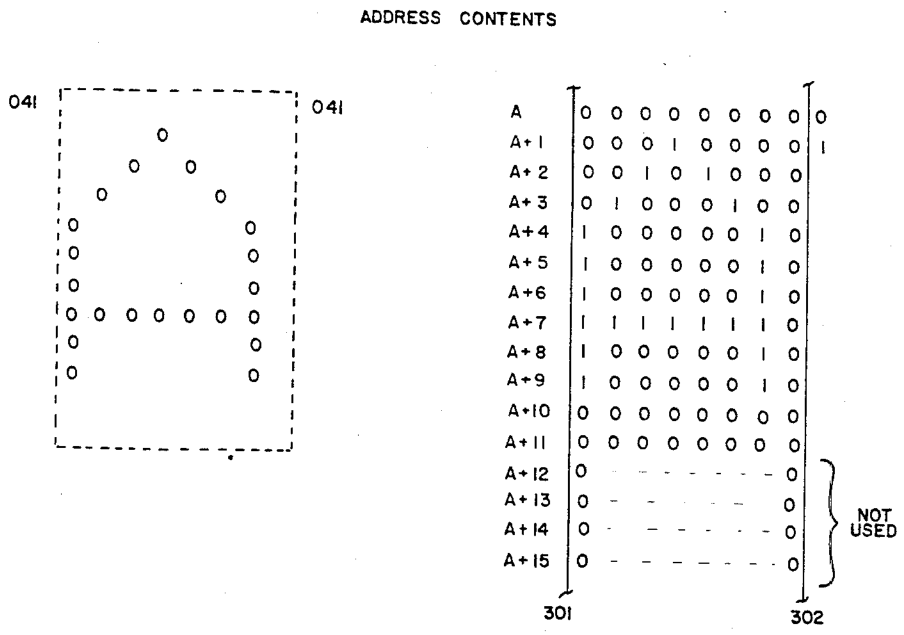
FIG. 3 is a schematic drawing of the addressing scheme of the invention for generating characters on a CRT utilizing video signals.

Referring now to FIG. 3, there is shown one character on one row in one column. There are 80 such character columns across the screen, and there are 25 character rows; thus 2000 characters can be generated on the page or screen. FIG. 3 shows how the letter "A" would be formed within the boundaries 301 to 302 when the total of 12 raster lines comprising one character row have been completed. (It should be noted that 9 raster lines are utilized in character generation; whereas 3 are added as a space between character lines.)

Figure 7:
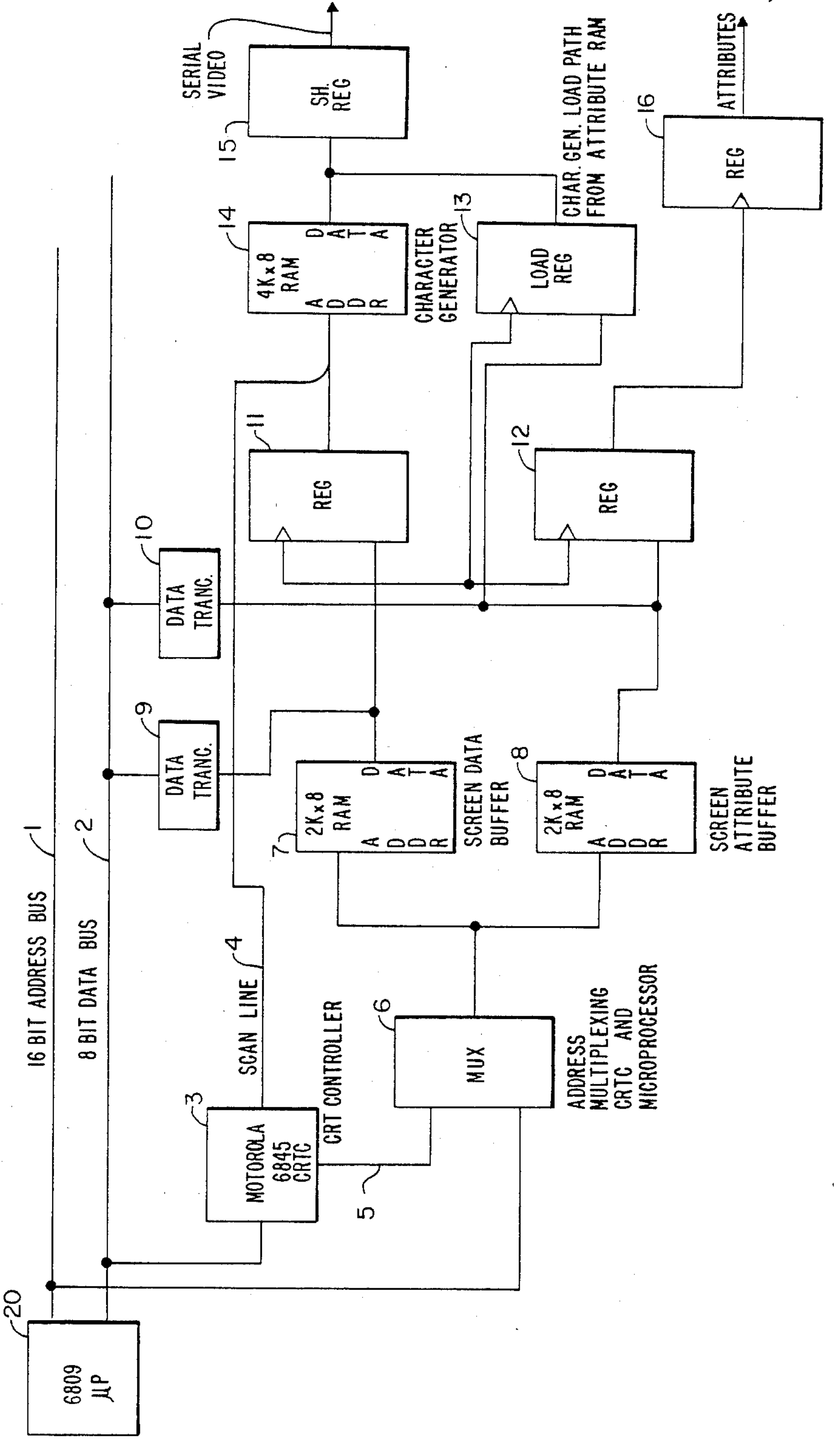
FIG. 7 is a more detailed logic block diagram of the invention showing one of three character generators.

In order to obtain this character (which may be part of a message), it first must be stored in a memory or buffer 7 shown on FIG. 7. In order to write this character on the screen, it must be generated by the character generator 14. The character generator stores different standard characters at different addresses which can be used to generate the characters of any message on the screen which is stored in buffer 7 as previously described. The pattern stored in the character generator 14 is addressed by utilizing the code of the character in the message as part of the address. In this case the hexadecimal code for "A" is 041, while the decimal code is 65. The address of the letter "A", therefore, would be 65×16 for the first raster line, and for the second it would be (65×16) +1, etc. As each raster line progresses across the screen, the patterns for different characters of the message are similarly addressed by their codes and a portion of each is generated until one full character line is generated by 9 successive raster lines.

Figure 4A:
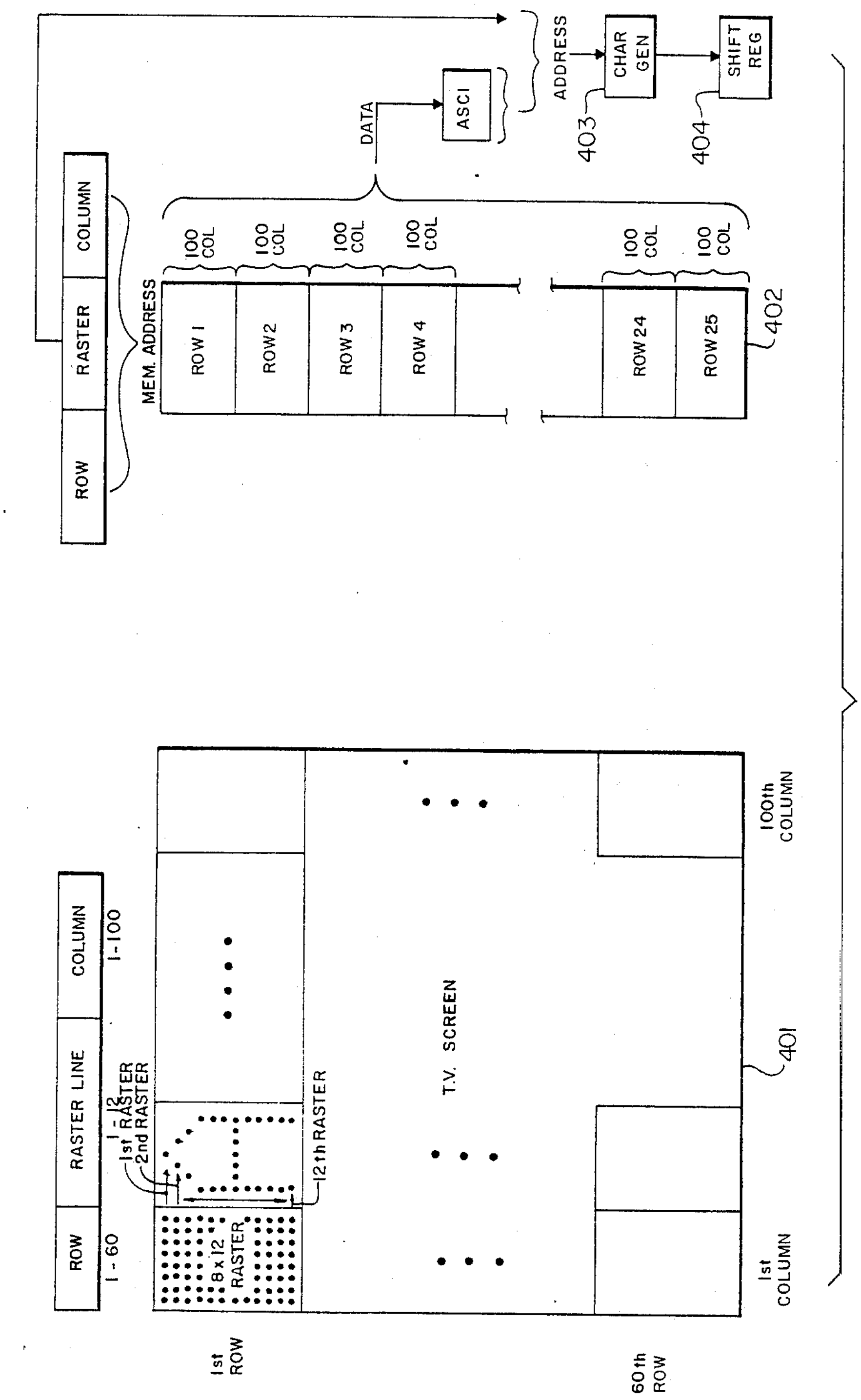
FIGS. 4A and 4B are high level logic block diagrams of one embodiment of the invention utilizing character generators.
Figure 4B:
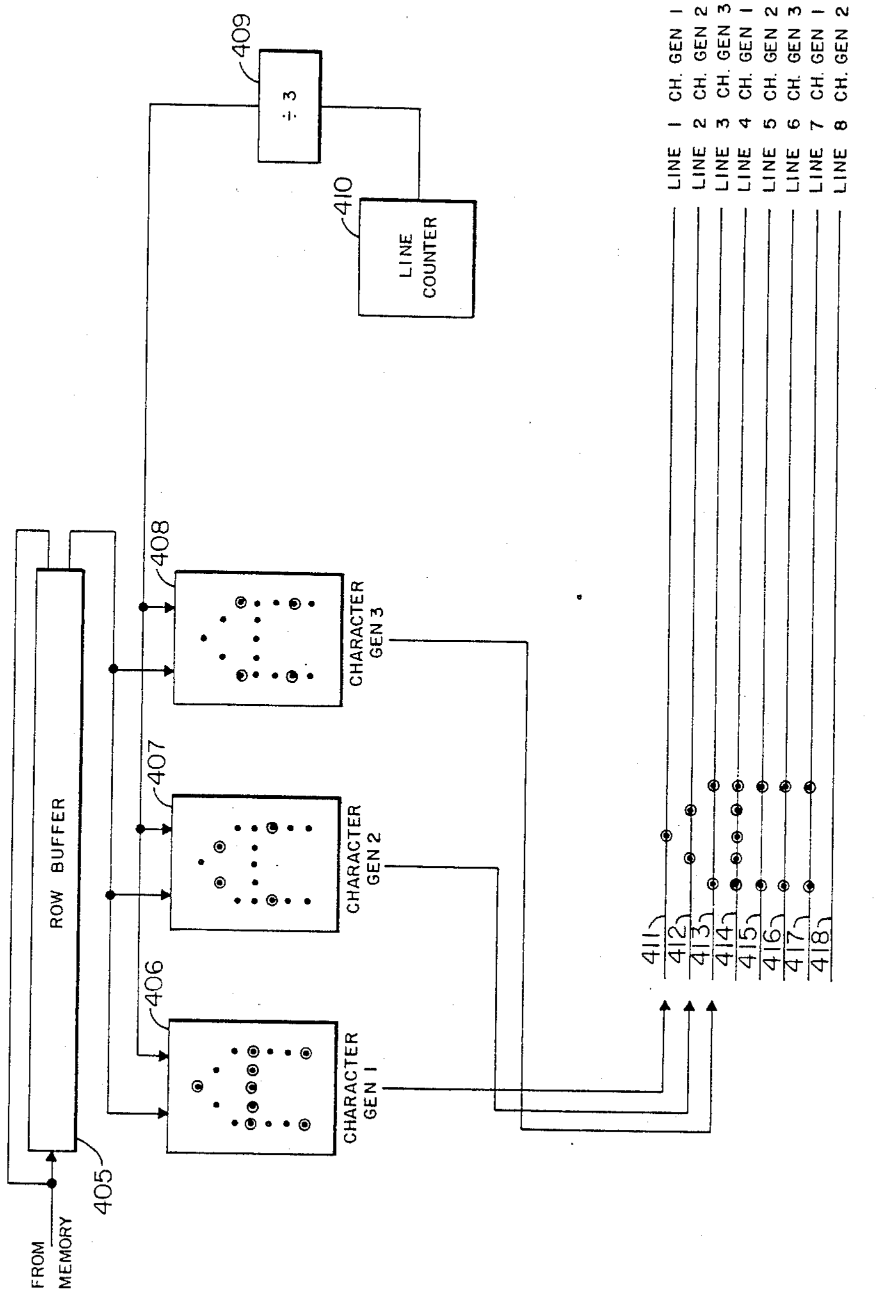

Referring now to FIGS. 4A and 4B of the invention, there is shown a schematic of a TV screen 401 which is comprised of the coated end of the CRT. A TV screen is coated with phosphorescent material which glows when a cathode beam impinges in any area. As shown, the screen is divided into 60 rows and 100 columns. At the intersection of a row and column there is an 8 by 12 raster. When the appropriate spot in this 8 by 12 raster is illuminated by the cathode beam as it sweeps across the screen, it can form any predetermined character; e.g., the letter "A" shown in the first row, second column of the TV screen. Accordingly by selecting appropriate characters to be displayed on the screen, any message can be written on the screen. The message is stored in memory 402 according to row and column. When it is desired to display the message on the screen; i.e., generate characters, the memory 402 is addressed by utilizing a row and column address. Data read out of the particular row and column addressed is in the form of an ASCII code which represents the particular character stored at that row and column. The ASCII code is then combined with a raster address, which represents the raster line within a row to address a particular character stored in character generator 403. Character generator 403 is nothing more than a ROM or RAM which has different characters representative of a character set stored in various portions of its memory. The particular character addressed is then applied to a shift register 404 and shifts the character stored to make it available at the appropriate time to modulate the cathode ray beam and form a portion of a character. Hence, in a CRT which requires 12 raster scans to form a full character, the character would be shifted through 12 times, making it available at the appropriate time to progressively paint the character. In a similar manner the character generators 406, 407 and 408 of FIG. 4B are addressed by reading out of the memory 402 characters which are stored in row buffer 405. Row buffer 405 is a circulating register which circulates the message in synchronism with the beam of the cathode ray tube as it scans horizontally across the face of the tube. As each character of the message reaches the end of the row buffer 405, the appropriate storage area for that particular character in character generators 406, 407 and 408 are addressed and that portion of the signal generated at that instant of time is applied to the appropriate line controlled by character generators 1, 2 or 3. Hence, since 12 raster lines must be scanned and since in this particular embodiment three raster lines at a time are scanned, a divide-by-three counter 409 cuts down the line count of line counter 410 from 12 to 4. In those four concurrent scans by the three cathode beams the letter "A" of the first row, second column will be generated in parts as shown in FIG. 4B. When these four line scans have been completed by the three beams, the second row is then addressed and the process repeated once again with a small portion of each character being generated as the three beams scan across the 100 columns.

Figure 5A:
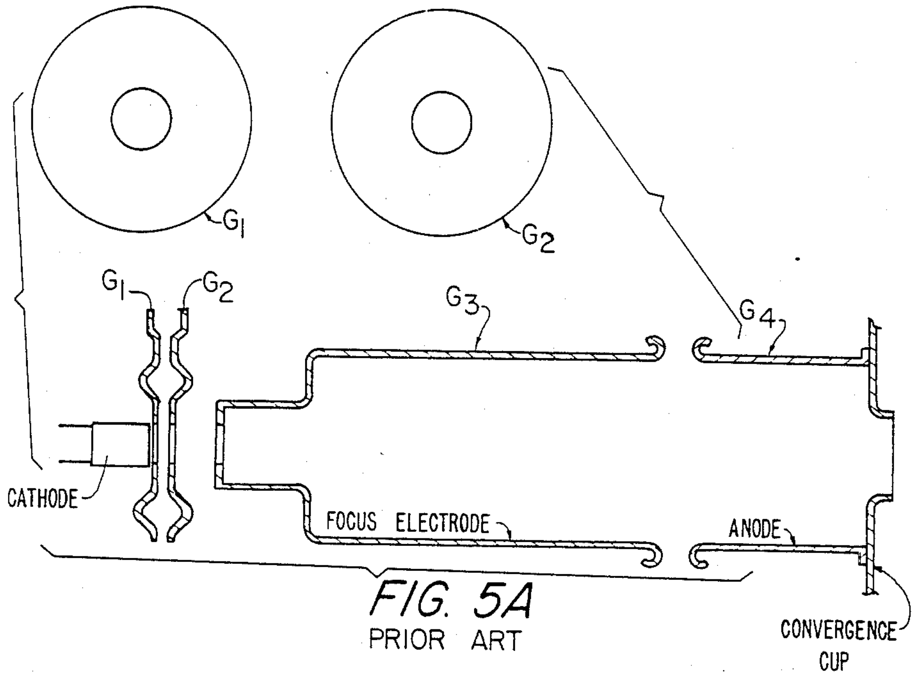
FIG. 5A PRIOR ART
FIG. 5A is a prior art schematic diagram of a single beam CRT.

Referring now to FIGS. 5A through 5D and FIGS. 6 through 6D, there is shown techniques in hardware for multiple beam scanning useful for videotext and videographics. FIG. 5A is a typical prior art CRT described in a book entitled "Color Television Picture Tubes, Supplement 1, Advances in Image Pick-up and Display", by Morrell, published by Academic Press, 1974. The cathode for a typical gun is formed of a thin nickel cup enveloping the heater, with the end of the cup coated with a material sensitive to the impingement of electrons. The cathode is operated at a temperature of about 1060° K. and is normally insulated either by means of a ceramic disk mounted within the G-1 cup, or by a separate support element which is brought out directly to beads (not shown), the beads providing insulation from the other elements. Element G-1, being a biasing grid to form a spot and control beam strength and having an aperture size varying from 0.6 to 0.9 mm, is shaped either as a cup or as a flat disk. Element G-2, is a voltage accelerator for accelerating the electron particles and typically has an aperture equal to slightly larger than the aperture in element G-1, and is also either a flat disk or a small cup. Element G-3 acts as a focusing lens and has an opening at the end toward the cathode which ranges from 1.5 to 5.0 mm in size; the main lens at the other end of the tubing is the full diameter of the tubing. Element G-4, the other half of the lens which further shapes the beam, is 1–1.25 mm with carefully smoothed and rounded edges to prevent localized high-voltage gradients.

Figure 5B:
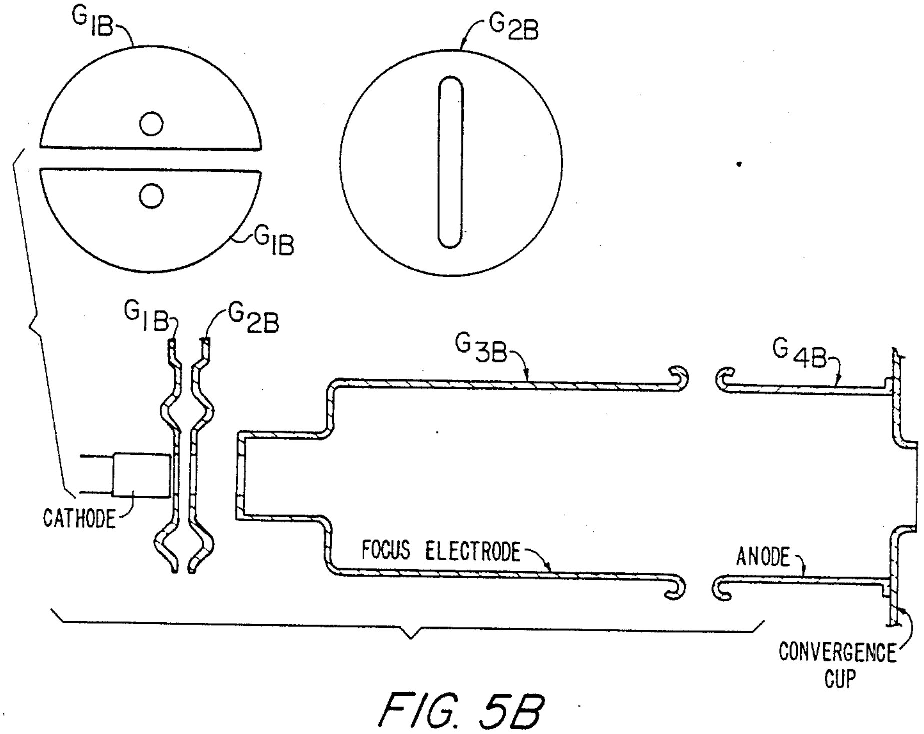
FIGS. 5B, 5C, 5D and 5E are schematic representations of methods of generating multiple cathode-ray-tube beams.

Referring now to FIG. 5B there is schematically shown a first embodiment of the invention. It will be observed that the structure of this CRT is substantially similar to the prior art FIG. 5A, but having some substitute structure which is unique to the invention. Accordingly in all subsequent discussions of the structure of the invention, the elements which are similar to the prior art will not be described again. In FIG. 5B the biasing grid G-1B is split so that there is a small space which is less than 0.1 mm to prevent any substantial portion of the beam penetrating biasing grid G-1B. Additionally the top and bottom elements of the split biasing grids have small holes with their center on one diameter of the circle of the grid and offset away from the center of the circle of the grid along the diameter of that circle. The low voltage accelerator G-2B has an opening which is oblong in shape along the vertical diameter of the circle.

Figure 5C:
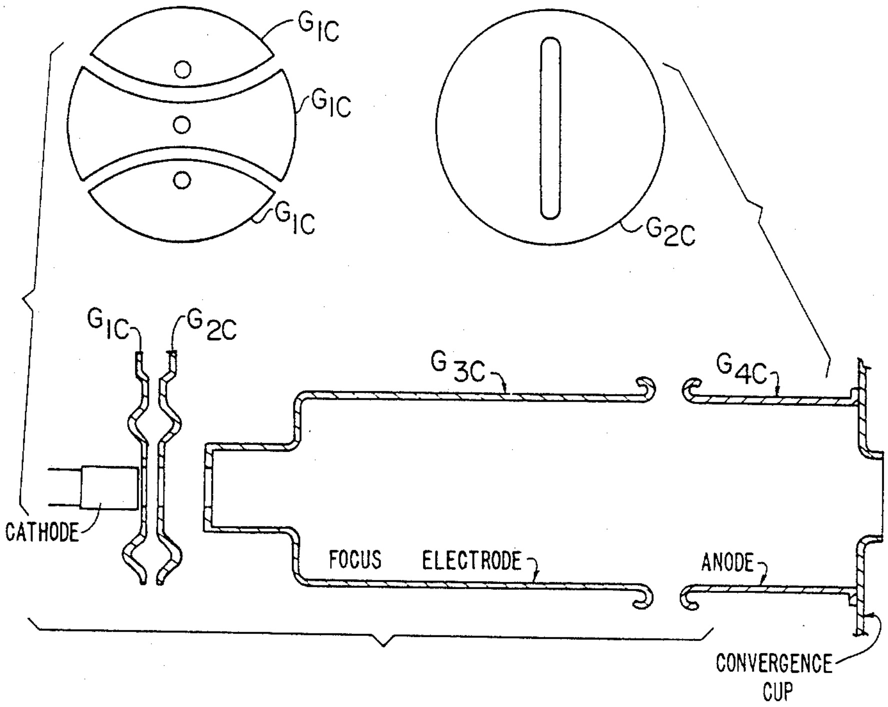

Referring now to FIG. 5C there is shown another embodiment of the invention. Biasing grid G-1C is split into three segments so that there is a small space between the segments. Each segment is approximately equal in area. Additionally each segment has a small hole along the vertical diameter of the circle of the grid encompassing the three segments. Once again the space between segments is very small, less than 0.1 mm so that significant current is not allowed to pass through them when any of the segments are biased. The low voltage accelerating grid G-2C has an elongated opening similar to the accelerating grid G-2B of FIG. 5B.

In operation, by biasing any of the segments of biasing grids G-1B and G-1C, it is possible to obtain an upper beam or a lower beam, or an upper and a lower beam, or none at all by using biasing grid G-1B. By using biasing grid G-1C, it is possible to obtain by appropriate biasing of G-1C, either three beams, two beams, one beam or no beams.

Figure 5D:
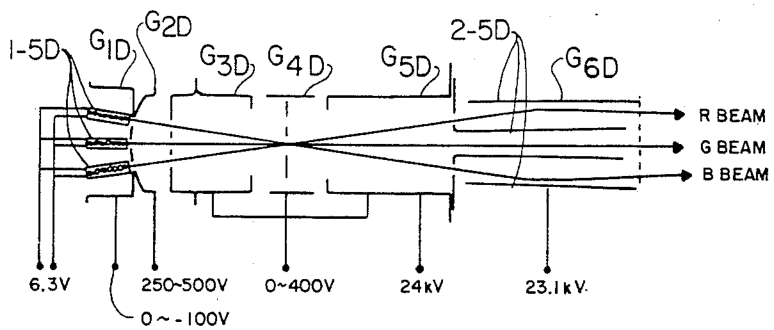
Figure 5E:
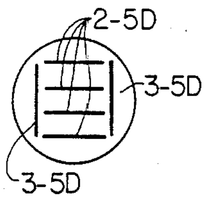

Referring now to FIG. 5D there is shown a schematic of an in-line multiple gun single main focus lens described in a book entitled "Color Television Picture Tubes, Supplement 1, Advances in Image Pick-up and Display" (supra). The invention of FIG. 5D, however, differs from the prior art device in that additional control deflection plates 3–5D permit greater control of the beam so that multiple in-line spots can be formed rather than one main line spot or a delta arrangement. In FIG. 5D there is shown multiple cathodes 1–5D which can be arranged either in-line or in-delta arrangement. Bias electrode G-1D provides biasing to form the beam spot and control the beam strength. Low voltage accelerating grid G-2D accelerates the electrons of the beam after it has been formed. Electrodes G-3D, G-4D and G-5D form the focus lens and focus the several beams so that they converge and cross in a predetermined position; and then diverge and enter the areas of the control deflection plates 2–5D and 3–5D. The voltage on the deflection plates is adjusted so that there separate beams can be formed. By controlling the voltage on the deflection plates, any beam may be completely cut off so that once again we can have either no beams, one, two or three beams at various positions, either singly or simultaneously. This differs from the conventional in-line color television tube wherein the colors are modulated and constantly mixed to provide a color picture and biasically has a delta pattern.

Figure 6:
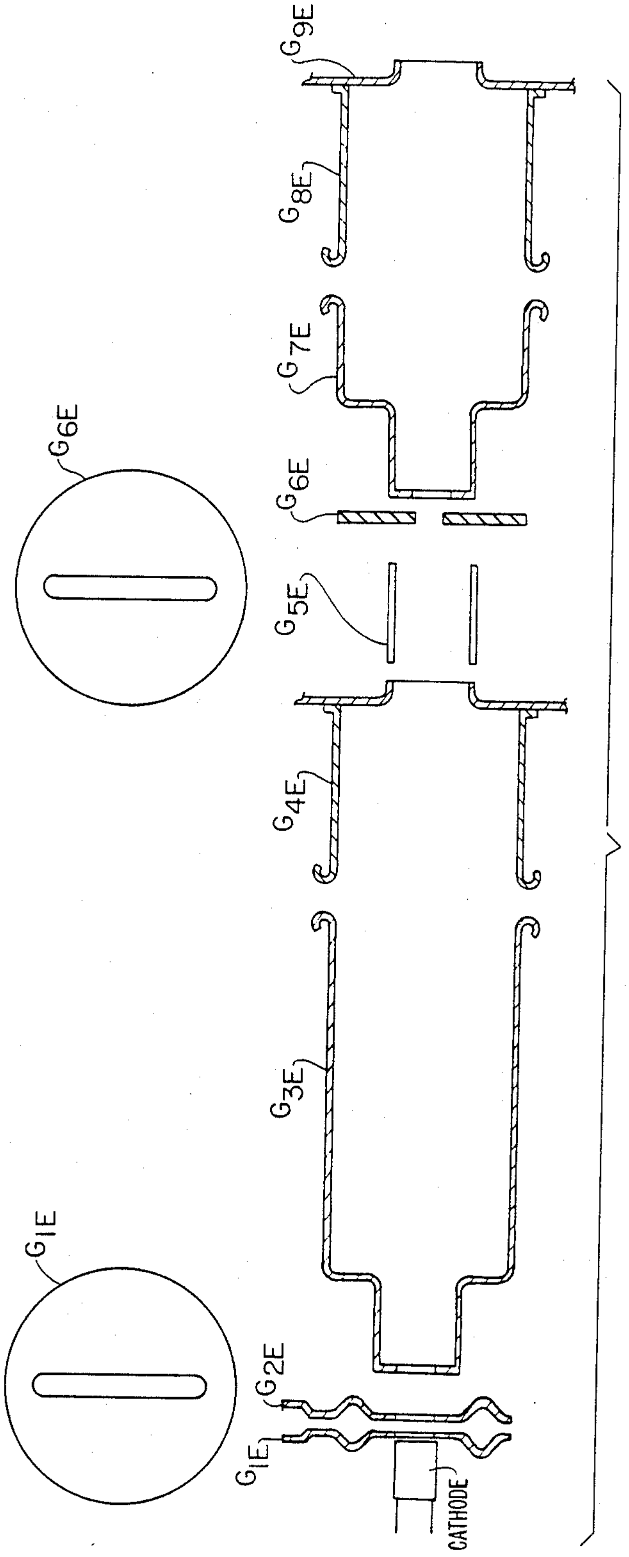
FIGS. 6D and 6C are schematic representations of means for generating multiple dots for a cathode-ray-tube.
FIGS. 6A and 6B are schematic representations of deflecting the beam to obtain dots in different portions on a CRT screen.
Figure 6A:
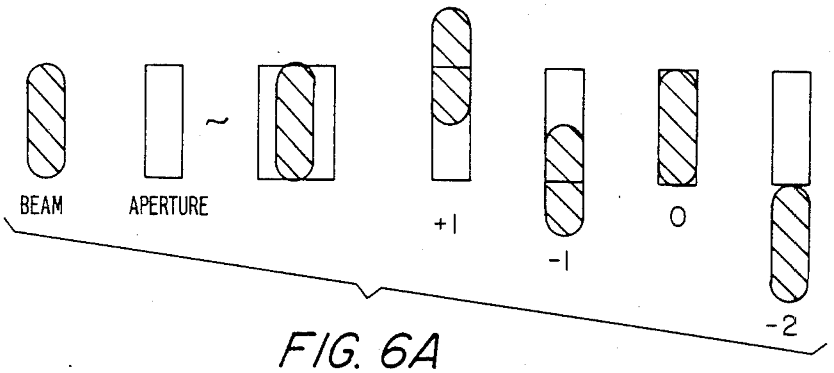
Figure 6B:
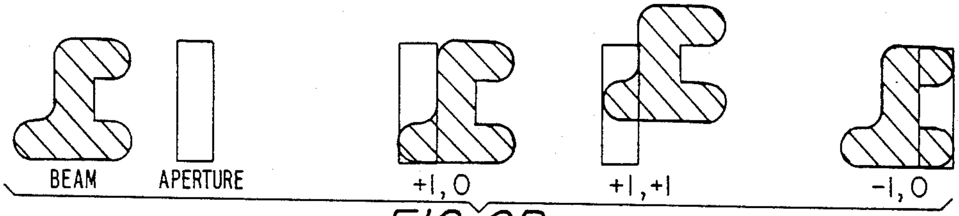
Figure 6C:
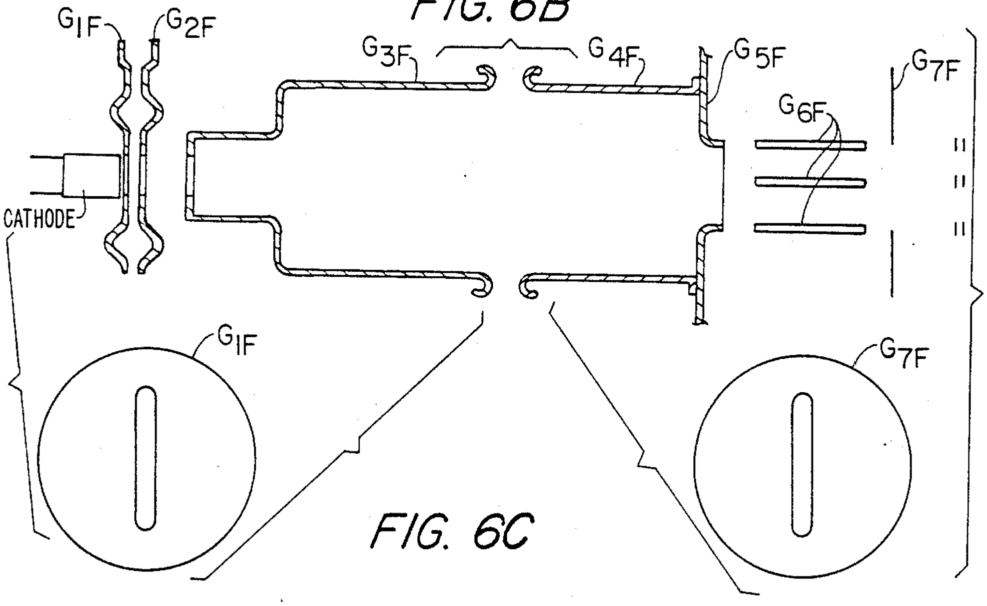
Figure 6D:
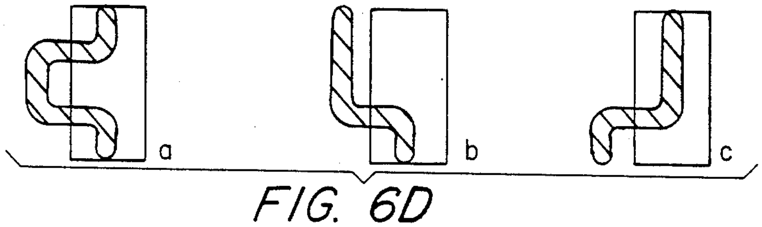

Referring now to FIGS. 6 through 6D, there are shown additional embodiments of creating and controlling multiple beams from a single electron gun. Referring to FIG. 6, biasing grid G-1E performs the shaping function of the beam and also controls the beam strength. Low voltage accelerating grid G-2E accelerates the beam into the focusing lens comprised of the G-3E and G-4E grids. After the beam has been focussed, it passes through vertical and horizontal deflection plates G-5E or deflection coils which surround the beam. The deflection plates deflect the beam up, down or sideways to form multiple dots on the screen as will be more fully described in FIGS. 6A through 6D. Grid G-6E has an elongated slit which permits all or a portion of the beam to pass through depending on how it is deflected by the deflection plates G-5E. Second focus electrodes G-7E and G-8E provide further shaping to that portion of the beam which is allowed through the aperture of electrode G-6E.

The operation of the embodiment of FIG. 6 will be further described by reference to FIGS. 6A and 6B. In FIG. 6A the aperture of biasing and shaping grid G-1E is in the form of an elongated oblong which produces a beam having an elongated oblong shape. When the beam finally reaches deflection plates G-5E, it will be deflected in one of four positions shown on FIG. 6A by +1, −1, 0 and −2. The −1 position shows that the beam has been deflected upward by deflection plates G-5E and accordingly the upper portion of the beam has been blocked by grid G-6E and only the lower portion of the beam has been allowed to pass through the aperture. Similarly in the −1 position of FIG. 6A the beam has been deflected downward and the spot that appears eventually on the screen is in the downward direction. The 0 position shows that the entire beam has been allowed to pass through; whereas the −2 position shows that no portion of the beam has been allowed to pass through.

In FIG. 6A the biasing and control grid G-1E has a shape similar to that shown and identified as the beam of FIG. 6B. Accordingly when the beam passes through deflection plates G-5E, it will be deflected either in a left or right direction, or in an upward direction as shown in positions +1, 0, 0 +1, and −1, 0 of FIG. 6B. Position +1, 0 shows that the beam has been deflected to the right and accordingly only a spot at the lower portion of the aperture of grid G-6E is allowed to pass through. In position +1, +1 the beam has been deflected to the right and upward and a spot is formed at the center of the aperture. Finally in position −1, 0 the beam has been deflected to the left and only the upper and lower spots are formed.

Referring now to FIGS. 6C and 6D, it will be seen that FIG. 6C is identical to FIG. 6. The difference is that when the beam reaches deflection plates G-6F, it is bent into various shapes, "a", "b", "c" of FIG. 6D, depending on the biasing that is applied to G-6F. With appropriate biasing the shape shown as in "a" of FIG. 6D may be obtained. When this shape is forced to pass through the elongated opening of grid G-7F, a portion of the beam is cut off as shown in "a" of FIG. 6D and therefore two spots on the top and bottom are obtained. In a similar manner, the beam may be bent by proper biasing as shown in "b" or "c" and accordingly dots at the bottom half of the opening or at the top half of the opening may be obtained.

The embodiments of FIGS. 5B, 5C and 5D require no special decoding since there is a one-to-one relationship between signals and the scan unit to which they apply. However, the embodiments of FIGS. 6A and 6B require the generation of specific deflection signals corresponding to the dot patterns to be produced. For two spots combinatorial logic is utilized; whereas for three spots PAL logic is utilized. Typical logic for this embodiment is shown in FIGS. 13 through 16 and described below.

A 900×840 pixel, but mapped display is generated three lines at a time using the shaped beam and aperture approach of this invention. A specific embodiment to generate bit patterns for three beams is described infra utilizing the following set of design parameters:

60 Hz refresh, no interlace

6% of time for vertical retrace—17,920 lines/sec

14% of time for horizontal retrace—18,340,480 dots/-sec.

These numbers permit count down of $2^{10}$ between dots and line, and $2^7\times7$ for line to frame. If it were not for the triple beam, the dot (pixel) rate would be 55 mHz and the line rate would almost be 54 kHz.

Figure 13:
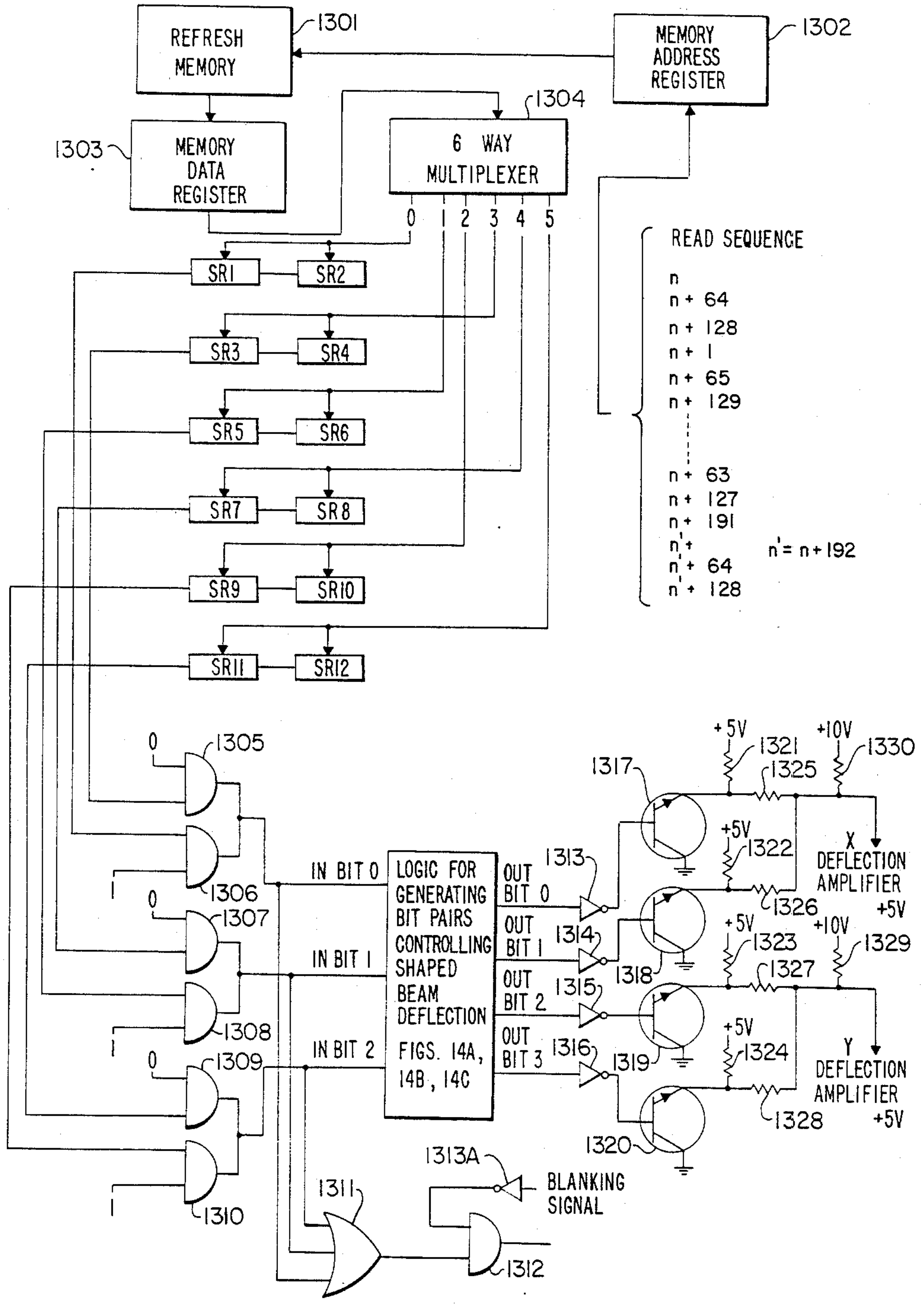
FIG. 13 is a logic block diagram of another embodiment of the invention utilizing bit mapping memory for generating multibeam graphics.

FIG. 13 is a logic block diagram of the apparatus. The Refresh Memory 1301 is a 64K×16 bit memory using fast commercially available DRAMS with well known techniques is addressed via address register 1302 for reading, writing and refreshing. Addressing is by 16 bit word and requires 16 bits for 64K words.

The read sequence shown accesses one word for each of three vertically adjacent lines in such a way that each corresponds to the same horizontal position along the video raster line.

The 16 bits in the memory data register (MDR) 1303 is transferred through a 6-way multiplexer (MPXR) 1304 to a bank of shift register SR1-SR12 shown as 8 bit capacity. SR1 and SR2 is loaded with a word for line n. SR5 and SR6 will take a word for line n+1, and SR9 and SR10 for n+2. While these registers are being shifted out to produce the three bit streams for those lines, the alternate set SR3 and SR4, SR7 and SR8, SR11 and SR12 will be loaded to provide the next sequential 16 bits for each line. While they are being shifted out, the first set will be loaded. The alternative between these outputs is controlled by AND gates 1305–1310 which permit the correct stream to reach the wires indicated as In Bit 0, In Bit 1, In Bit 2. These three signals are OR'd together in OR gate 1311, to provide an enabling signal for the CRT through AND gate 1312 so that if no bits are present the beam will be blanked by enabling the blanking signal through inverter 1313A. Then the three In Bits enter logic shown in FIGS. 14A, 14B and 14C to generate the small deflections which move the shaped beam over the aperture. This logic is shown in FIGS. 14A, 14B, 14C utilizing the truth table of FIG. 15A. The two bits Out Bit 0 and Out Bit 1 are binary coded utilizing gates 1401–1404, 1406 and inverters 1411, 1412 to control the X deflection. Since three positions are needed, only three out of four possibilities are required. The interpretation shown is:

01—lowest value, deflect one step negative; i.e., in direction of (−X).

10—middle value, no deflection

11—highest value, deflect one step positive; i.e., in direction of (+X).

The two bits for Y direction, Out Bit 2 and 3, are generated utilizing AND gates 1407, 1408, 1409, NOR gate 1410, and inverters 1413, 1414, 1415, and are interpreted in the same way as above except the deflection is for the Y direction. The circuits shown generate the following voltages:

| | |
|---|---|
| 01 | +2 V |
| 10 | +5 V |
| 11 | +8 V. |

If +5 V is fed into the other input of a differential amplifier, appropriate voltages are generated for the X deflection. FIGS. 14A, 14B, 14C shows the logic required in generating the deflection control bits from the bit patterns representing the 3 pixels on the three lines being scanned as previously described.

Figure 16A:
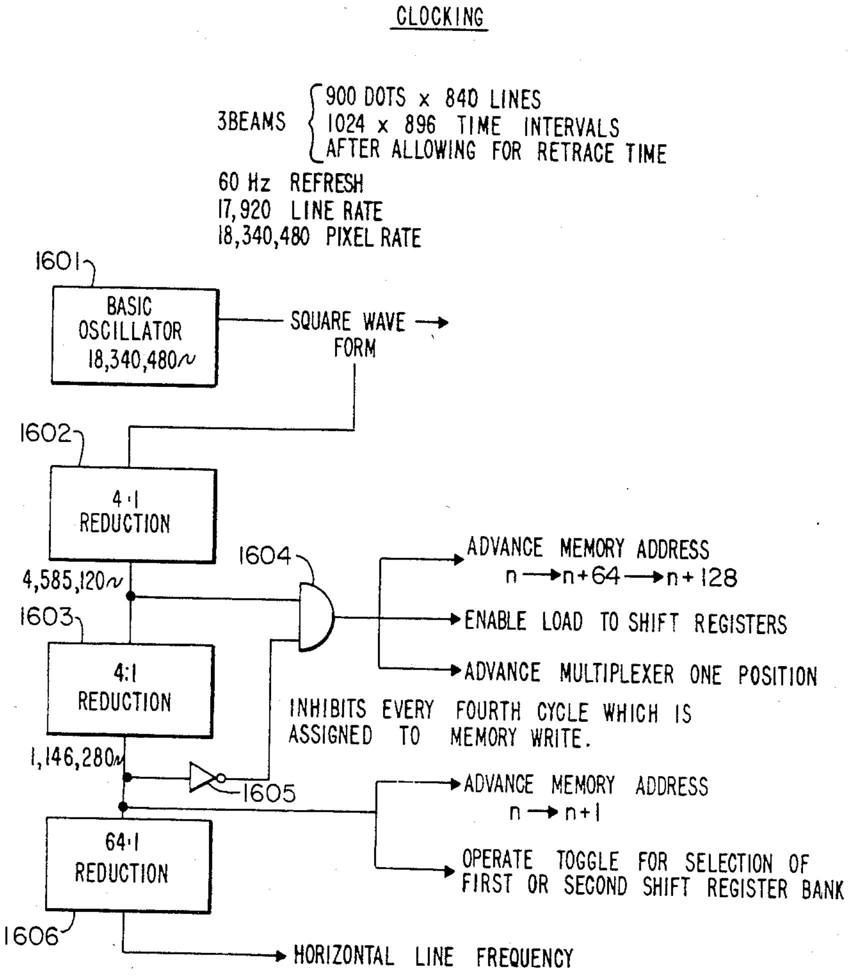
FIGS. 16A and 16B are hardware flow diagrams showing the clocking required to drive the hardware logic of FIG. 13.
Figure 16B:
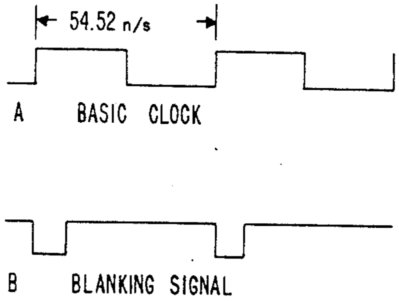

FIGS. 16A and 16D show the clocking required to drive the logic in FIG. 13.

(If it is desired to generate a text display directly from character coded data, then the logic in the upper portion of FIG. 13 can be replaced by a set of character generators using ROMS as indicated in FIG. 4B.)

FIG. 15A is a truth table which shows the functional results of FIG. 13 and FIGS. 14A, 14B and 14C. The three bits on the left side of the truth table represent the three picture elements selected from three vertical lines having the same horizontal position. The four bits on the right hand side of the truth table are those bits which control the small deflections of the shaped beam past the aperture. For example, the second entry in the truth table shows 010 for the In Bits (FIG. 13). Thus In Bit line 0 has no picture dot in it, while In Bit line 1 has a picture dot and In Bit line 2 does not have a picture dot.

The four bits on the right hand side of the truth table which are the consequence of those entries on the In Bit lines represent in the case of the first two bits the control of the deflection, and as stated supra the bits 11 corresponding to the 010 In Bit pattern indicate a positive deflection of one element. The last two bits represent the Y deflection and the bits 10 indicate there is no Y deflection. The combination of the four bits of the 1110 pattern, therefore, requires one to make a positive deflection of one element to the right; i.e., in the X direction and no deflection up and down; i.e., in the Y direction.

FIG. 16A shows the clocking required to drive the hardware logic of FIG. 13. It starts with a basic oscillator 1601 of 18,340,480 cycles per second which corresponds to the basic clock rate. That oscillator is squared up to generate the basic clock signal A as shown on FIG. 16B. In order to blank the cathode ray tube when the beam is being moved to generate different patterns, a blanking signal is required which is obtained as shown by differentiating and inverting the basic clock signal 1604, 1605. The basic clock is counted down four to one as shown in 4:1 reduction 1602 to generate a clock level which is required for memory control. Three things are controlled by this rate of 4,585,120 cycles. The memory address in Memory Address Register 1302 is advanced to read in the next appropriate 16 bits from memory. The load to selected ones of the shift registers SR1–SR12 has to be enabled and the multiplexer 1364 has to be advanced one position. It can be seen from the sequence of memory addresses on FIG. 13, that it relates to that address n which is advanced to n+64 and represents a 16 bit word applying to the next line; then it advances to n+128 representing the 16 bit word for the third line. After three words have been read from memory, one period for a write or change data into this bit memory is allowed. Circuit 1603 performs a further 4:1 count reduction, and that output is passed through an inverter 1605 back to the output from 1602 to inhibit every fourth cycle—i.e., the one that is assigned to memory writing. The rate of 1,146,280 is required for advancing the basic memory address and operates a toggle switch (not shown) for selecting an output from the first or second shift register bank SR1–SR4. Counter 1606 then counts down a further 64:1 and creates the horizontal line frequency.

TABLE I

| REFERENCE NUMERAL | ELEMENT NAME | NUMERICAL VALUE | COMMERCIALLY AVAILABLE |
|---|---|---|---|
| 1301 | Dynamic Random Access Memory (DRAM) | 16.4K × 16 Bit | Texas Instruments (T.I.) |
| 1302, 1303 | Registers | N.A. | T.I. |
| SR1-SR12 | Shift Registers | N.A. | T.I. |
| 1305-1310 | AND Gates | N.A. | T.I. |
| 1311 | OR Gate | N.A. | T.I. |
| 1313A, 1313, 1314 1315, 1316 | Inverters | N.A. | T.I. |
| 1317-1320 | NPN Transistors | N.A. | T.I. |
| 1321, 1323 | Resistors | 2200 Ω | T.I. |
| 1322, 1324 | Resistors | 1600 Ω | T.I. |
| 1325, 1327 | Resistors | 200 Ω | T.I. |
| 1326, 1328 1329, 1330 1331 | Resistor | 800 Ω | T.I. |
| 1401, 1402 1403, 1404 1406, 1407 1408, 1409 | AND Gates | N.A. | T.I. |
| 1405, 1410 | OR Gates | N.A. | T.I. |
| 1411, 1412 1413, 1414 1415 | Inverters | N.A. | T.I. |

In order to provide appropriate refreshing a bit map representative of a map for the entire picture is stored in memory and read out as required for refresh. If the bit map is 1000×1000, this represents 128,000 bytes of information. The memory then can be conventionally organized in bytes or 16 bit words using 64K DRAMS.

If the dots of the raster scan are stored as bytes, the 128 bytes will hold a line. For a simple one-line scan a byte is read out and the 8 bits are fed sequentially to the video drive. For 500 dots and tv scan rates, this is one microsecond per character and DRAMS can support it. It is even possible to refresh out of main memory if 2 bytes are read out simultaneously. For 1000 dots and high speed scans the time is reduced to about 250 nanoseconds for one byte and 500 nanoseconds for two bytes. DRAMS can still support it, but not from main memory.

For the simultaneous scanning of three lines to obtain a 1000 dots per line at tv raster speeds, 3 bytes are needed (one per raster line) every 500 nanoseconds. A DRAM devoted to refresh can easily accommodate this and allow sufficient cycles for changing data.

If the memories organized at 16 bits×64K, then we can break up each line into 64×16 bit words and the address of a bit looks as follows:

| 10 bits line address | 6 bits words in line |
|---|---|

A possible addressing scheme below permits fast read out of sequential row addresses after a column address is set up from 64K DRAMS.

If the memory is organized like the display four words can be scanned along the line, then the equivalent sections of the other two lines can be read in a group repeating the process. Fast storage for two sets of words is provided—one loading and one being scanned for video. This requires two sets of 12 words for a toal of 24 words.

Referring now to FIG. 7, there is shown a high level logic block diagram of the invention for one character generator. Two busses, a 16-bit address bus 1 and an 8-bit data bus 2, are coupled to a commercially available Motorola 6809 microprocessor 20. Under control of the microprocessor 20, the microSystem 6/10 system (not shown) communicates to the terminal, of which the invention is a portion, via the address and data busses 1, 2. Two commercially available 6116 RAMs 7 and 8 respectively are coupled to the 8-bit data bus 2 via commerically available 74LS245 transceivers 9 and 10. The transceivers 9 and 10 can transmit data in either direction from the bus to the RAM or from the RAM to the bus. The data is placed into the RAM 7 or 8 at addresses controlled by the microprocessor 20 via address bus 1. Selection of the RAM 7 or 8 in which data or attributes is to be stored is done via the low order bit of address bus 1 through logic not shown. Accordingly, when a message is to be written on the CRT screen (not shown), data (i.e. the message) is written into the RAM 7 via transceiver 9 at addresses provided by the microprocessor 20. In a similar manner, attributes (i.e. underlining, blinking, etc.) are written via data transceiver 10 into RAM 8. In order to write on the CRT screen (not shown), it must be done piecemeal for each character as each scan line progresses across the screen (not shown), as previously described supra. Subsequently, under control of the CRTC 3, each character of the message is addressed and read out into register 11. Similarly, each attribute corresponding to any given character is simultaneously read out into register 12. For any character of a message temporarily stored in register 11, a full address comprised of 8 high-order bits (which in reality represent the character code) and 4 low-order bits (which represent the scan lines, and which count 12 different scan lines 0–11) is presented to character generator 14. Character generator 14 is comprised of two commercially available 6116 RAMs which stores a set of character patterns of any distinctive type which can be addressed by the address formed by concatentating the character code with a scan line code as described above. As each separate scan line of a CRT screen (not shown) progresses through 80 character time-frames a portion of each character is written in each time-frame on each scan line as indicated at each time-frame by the character temporarily stored in register 11 for that particular time-frame. The scan line address will cycle from 0 to 11, and when 12 complete scan lines have been made on the screen, then 80 characters would be completed on the screen as one row. The shift register 15 coupled to the character generator 14 and the load register 13 are the means for converting parallel data to serial data.

One feature of the invention is to have the attribute for a particular character arrive at the screen (not shown) at precisely the same time that the character arrives. This is accomplished by storing the character data in the screen data buffer and the attribute data in the screen attribute buffer. As each address is presented to the screen data buffer and the screen attribute buffer, the character being addressed is placed in register 11 and the attribute being addressed is placed in register 12. Thus the character code and the attribute code are available to the control logic to be written on the screen at the same time. Thus, since both the character information and attribute information is available at precisely the same time, it makes for very precise timing and a clear image on the screen.

It will now be shown that the invention provides a means of loading the character generator RAM 14 of FIG. 4 which requires the minimum of additional hardware over that required for the character generator function. The heart of the invention consists of adding the single register 13 of FIG. 7 to provide a path for the data to be written into the character generator 13, together with a Character-Generator-Load mode flip-flop 17 and associated control element 18 of FIG. 7. When this flip-flop is set to the Character-Generator-Load state, the Character Generator RAM is set to Write mode and the tristate output of register 13 described above is enabled so that the contents of the register 13 are written into RAM 14 on every character clock cycle so long as this mode remains in effect. Now, the address at which the data are written is the twelve-lead address consisting of the 4 scan line leads emanating from the CRTC 3 and the 8 leads amanating from the register 11 just as when the RAM 14 is used for its normal character generation function. Also note that register 11 is fed by the "data" half of the screen buffer RAM 7 while the register 13 which contains the data to be written is fed by the "attribute" half of the screen buffer RAM 8.

What remains then, is to show that there exists a combination of a "load" of the screen data/attribute RAMs and a programming or, as in actuality, a set of programmings of the CRT 3 which in conjunction with the Load-Mode hardware described above will cause the desired table to be loaded into the character generator 14. The general strategy employed is to load the "attribute" side of the screen buffer with the screen patterns and to load the "data" side of the screen buffer with the internal code normally used to evoke the associated patterns. These patterns are 12 scan lines in height in the present instance, but, in order to simplify the addressing of the character generator RAM 14, the patterns are allocated to blocks of 16 sequential locations. This allows for an implementation where the address is simply the concatenation of the character code with scan line number. Since the screen buffer data and attribute RAMs contain 2048 (2K) locations, there is room for 2084/16=128 patterns in one "load" of the data/attribute RAM. This is one half of the 256 patterns which are desired to be loaded into the character generator so that the procedure must be split into two phases. Typically, the split will be according to the internal code set with the first 128 codes being handled in the first phase and the remaining 128 codes being handled in the second phase. The remaining description will be directed to the operation of one of these phases, bearing in mind that the only distinction between the two phases is in the values of the data which are loaded into the data and attribute RAMs 7 and 8.

At the beginning of each phase, the screen attribute and data buffers are loaded with 128 patterns and the internal codes for same respectively, the codes being replicated 16 times over. The details of the ordering of these data within the screen buffer RAMs are governed by the operation of the CRTC 3 which we will now consider.

The CRTC 3 is capable of being loaded with certain parameters which will then control its operation. Among these parameters, the following are of interest to the present discussion.

Number of characters per row
Number of scan lines per character row
Number of character rows
Screen buffer starting address.

One purpose of the CRTC is to generate the proper sequence of addresses to the screen buffer to allow for the display of the patterns associated with the codes therein while also generating scan line numbers to serve as part of the character generator address as explained earlier. Another purpose of the CRTC is to afford ease of scrolling by allowing the beginning of screen to correspond to an arbitrary location in the screen buffer, hence the Starting Address parameter.

The operation of the CRTC consists of emitting a sequence of screen buffer addresses and scan line numbers (as well as synchronizing pulses not covered here). In particular, the sequence emitted consists of a linear seuence of screen buffer addresses commencing with the screen buffer Starting Address, the length of the sequence being equal to the Number of Characters per Row parameter, while holding the emitting scan line number at ZERO. After a suitable synchronization interval, this identical sequence of screen buffer addresses is repeated while holding the emitted scan line number at a value of ONE. This process is repeated for the number of times specified by the Number of Scan Lines per Character Row parameter. Following this, the entire process is then repeated with the next sequential set of screen buffer addresses, this level of iteration being repeated until the number of repetitions is equal to the Number of Character Rows parameter.

Thus, for a display of 80 characters per row with 12 scan lines per character row and 25 character rows, the sequence would consist of the first 80 addresses (commencing with the Screen Buffer Starting Address) with the scan line number held equal to ZERO followed by these same first 80 addresses with the scan line number held equal to ONE, etc. until the scan line number equals 11. Following this, the second 80 addresses are generated 12 times over, etc., until lastly the 25th set of 80 addresses are generated twelve times over (with the scan line number ranging from 0–11 with each repetition of the same set of addresses). With this knowledge of the inherent capability of the CRTC in mind, we choose to program the CRTC in the following "artificial" configuration for the purpose of loading the character generator.

Number of characters per row=128
Number of character rows=1
Number of scan lines per character row=variable
Screen Buffer Starting Address=variable.

Figure 11:
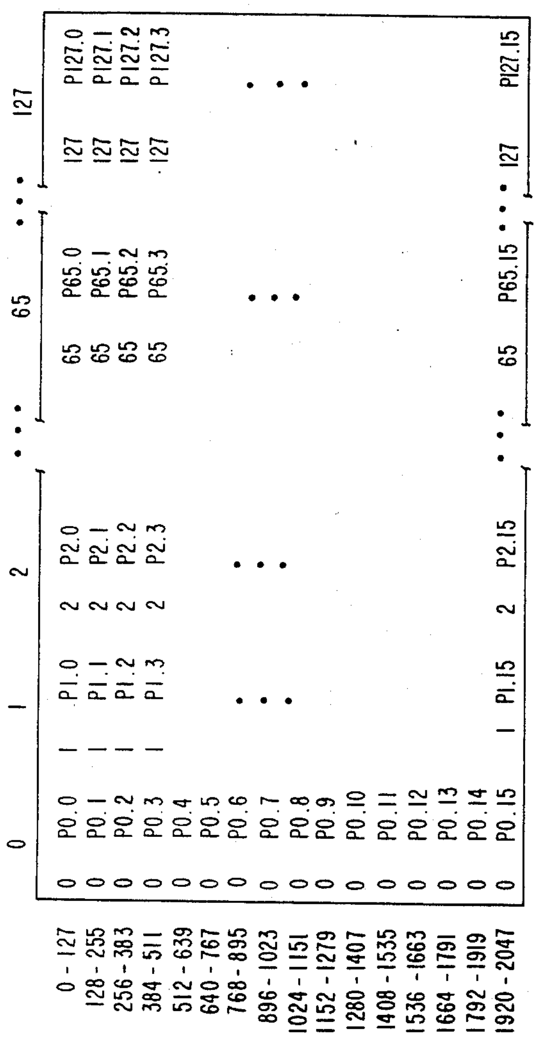
FIG. 11 shows the organization of data in the Screen Buffer RAMS 7 and 8.

FIG. 11 shows the organization of data in the Screen Buffer RAMs 7 and 8. The left half of each column represents the contents of the "data" buffer 7, while the right half represents the contents of the "attribute" buffer 8. The numbers across the top are the decimal address of the first 128 locations (those in the first row) while the numbers along the left side show the range of addresses encompassed in each of the rows. The case shown in FIG. 11 is for the first phase; i.e., for character codes 0–127 and as can be seen, the contents of the "data" buffer (the left half of each column) is simply this range of numbers in sequence and replicated 16 times over. The notation "Pa.b" (where "a" and "b" are numbers) shown for the contents of the right half columns refers to the numeric value for scan line "b" of the pattern for the character whose code is "a". To clarify this, let us use the example of FIG. 3. If the character code for "A" is 65 (which it is in ASCII), then we see that P65.0=0, P65.1=16 (00010000 Binary), P65.2=40 (00101000 Binary), etc.

The appropriate pattern, organized as above, is loaded into the screen buffer by a suitable program residing in the 6890 at the start of each phase.

We will now describe the operation of the loading algorithm. Due to constraints imposed by the normal functioning of the CRTC, the process for one phase must be divided into 16 passes. For each pass, the CRTC is programmed as described below, then the character generator is placed in the Load Mode until the entire CRTC sequence has been emitted. (This is determined by monitoring by means not shown here of the Vertical Sync signal emitting by the CRTC at the end of each complete sequence that it generates.) For the sake of completeness, as well as for simplicity, we will describe the loading of patterns with the full range of 16 scan lines recognizing that improvement in loading time would be achieved by only loading those scan lines actually used for the display.

FIG. 12 shows the values used for the Starting Address and Number of Scan Lines parameters for each of the sixteen passes. We see that on the first pass, the Starting Address is set to the address corresponding to the beginning of the last row of FIG. 8, this being the area where the scan line 15 slices of the character patterns are stored. The CRTC will sequence through this row of addresses sixteen times over while stepping the scan line number from 0 to 15. Now, since the "data" halves of each location simply contain the sequence 0–127 and since this, together with the scan line number, forms the address to the Character Generator RAM 14, this means that the scan line 15 patterns (the right halves of the last row of FIG. 8) will be written sixteen times over into the Character Generator 14. The first fifteen of these iterations are not desired, but the sixteenth does load the scan line-15 pattern information into the proper locations. In the second pass, the Starting Address is set to 1792 (the next to last row of FIG. 8) but this time the number of scan lines is programmed for 15. This means that on this pass the scan line number output by the CRTC will only range from 0 to 14 so that the scan line-15 pattern information which was loaded in the first pass will remain intact. Again, on this pass, only the last of the iterations (fifteen this time) through the 128 specified addresses in the screen buffer is fruitful. And so the process proceeds, moving up one row of FIG. 11 each time, while decreasing the Number of Scan Lines parameter by one until on the last (sixteenth) pass we are at last down to a case which is 100% efficient; namely scanning once through the first 128 locations. At this point, the half of the character generator appropriate to the current phase is fully loaded.

Figure 8:
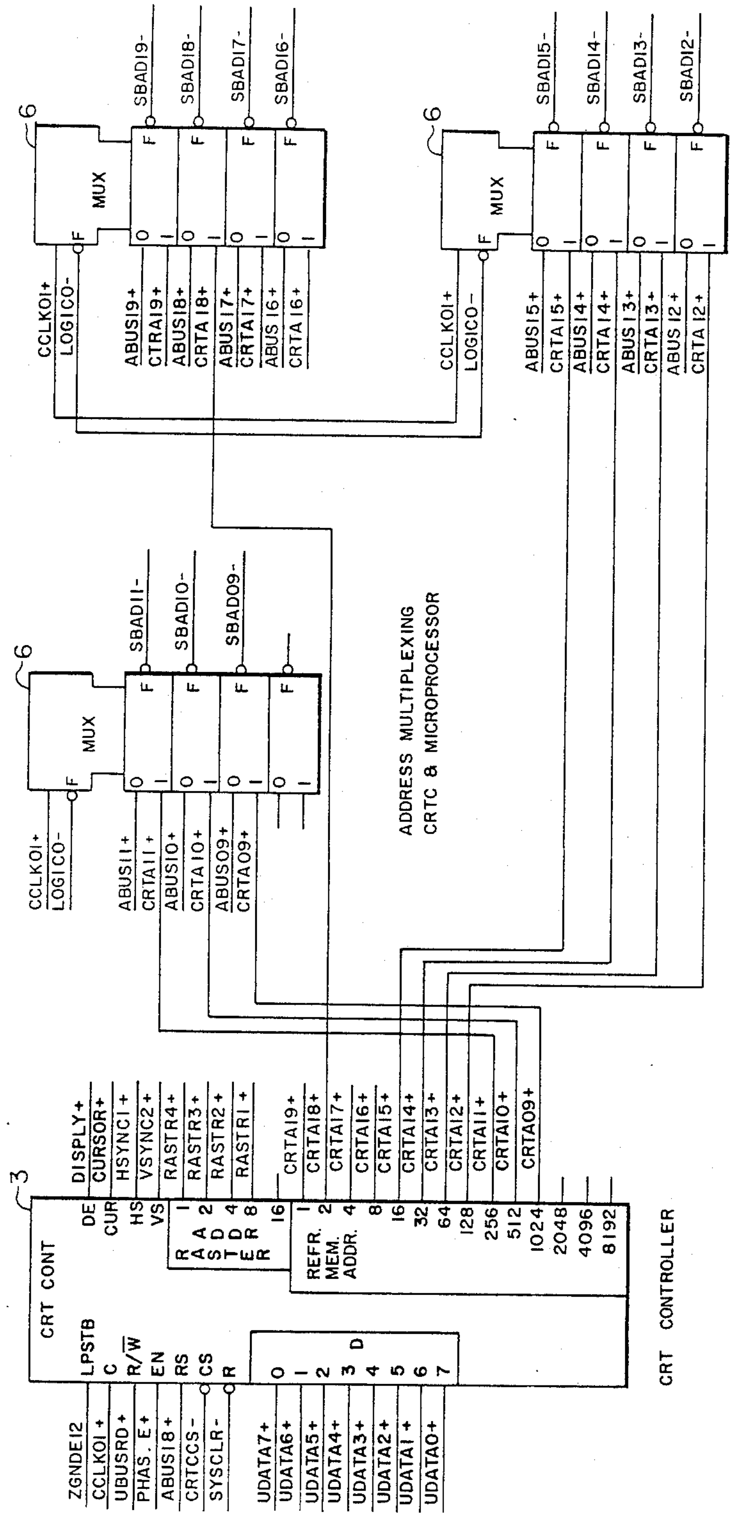
FIG. 8 is a detailed logic block diagram of the CRT controller and the MUXs of the invention for one of three character generators.
Figure 9:
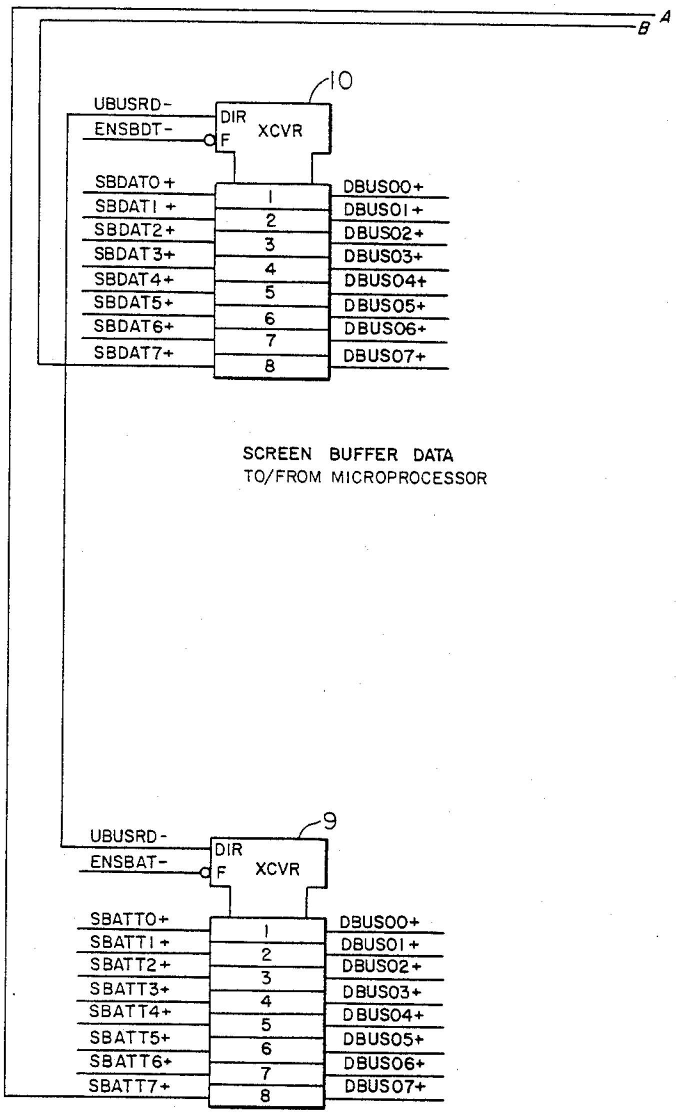
FIG. 9, Sheets 1 and 2, is a detailed logic block diagram of the transceivers to/from the microprocessor, the screen attribute buffer and the screen data buffer of the invention for one of three character generators.
Figure 9:
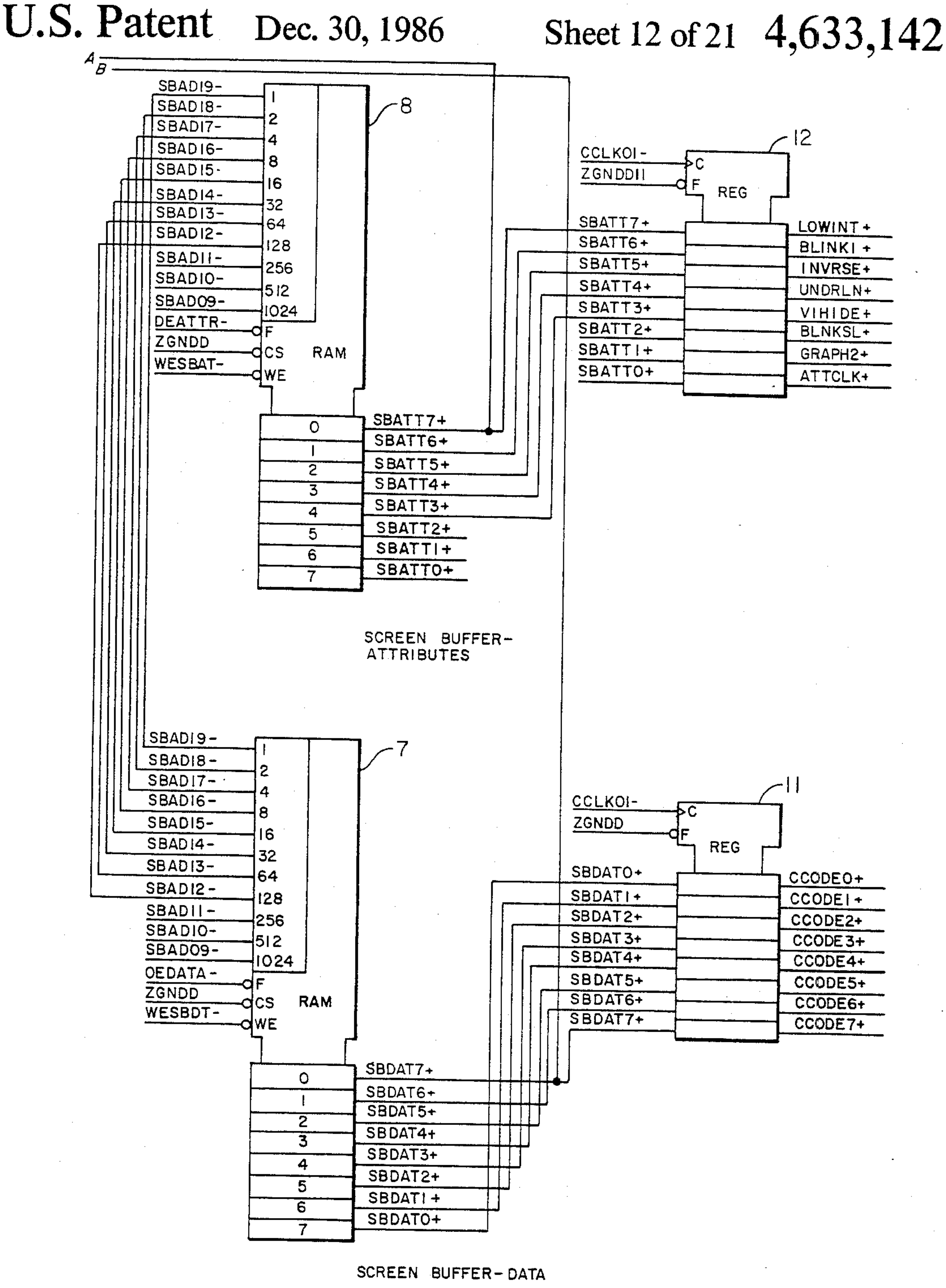
Figure 10:
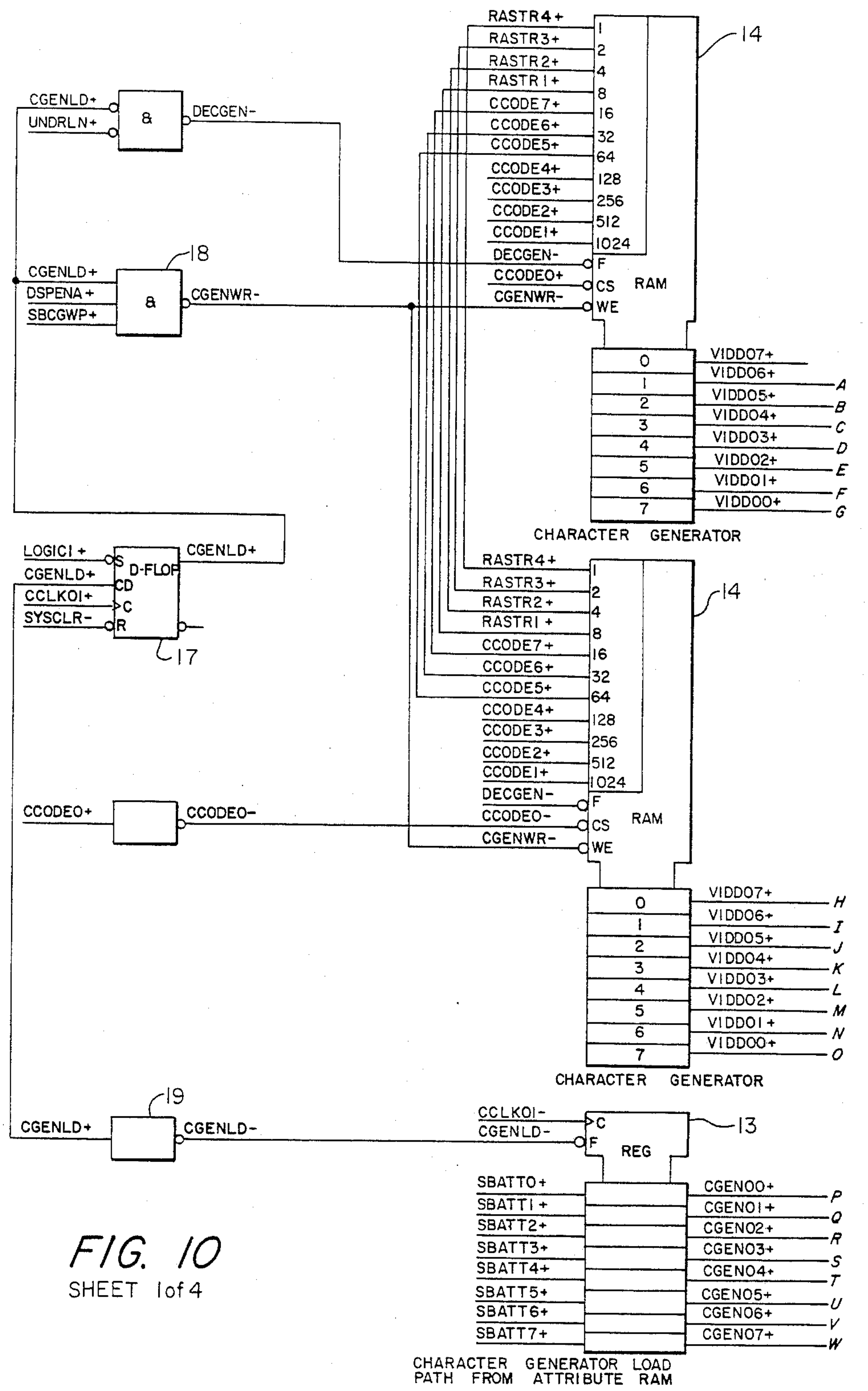
FIG. 10, Sheets 1–4, is a detailed logic block diagram showing one of three character generators and various storage registers and shift registers.
Figure 10:
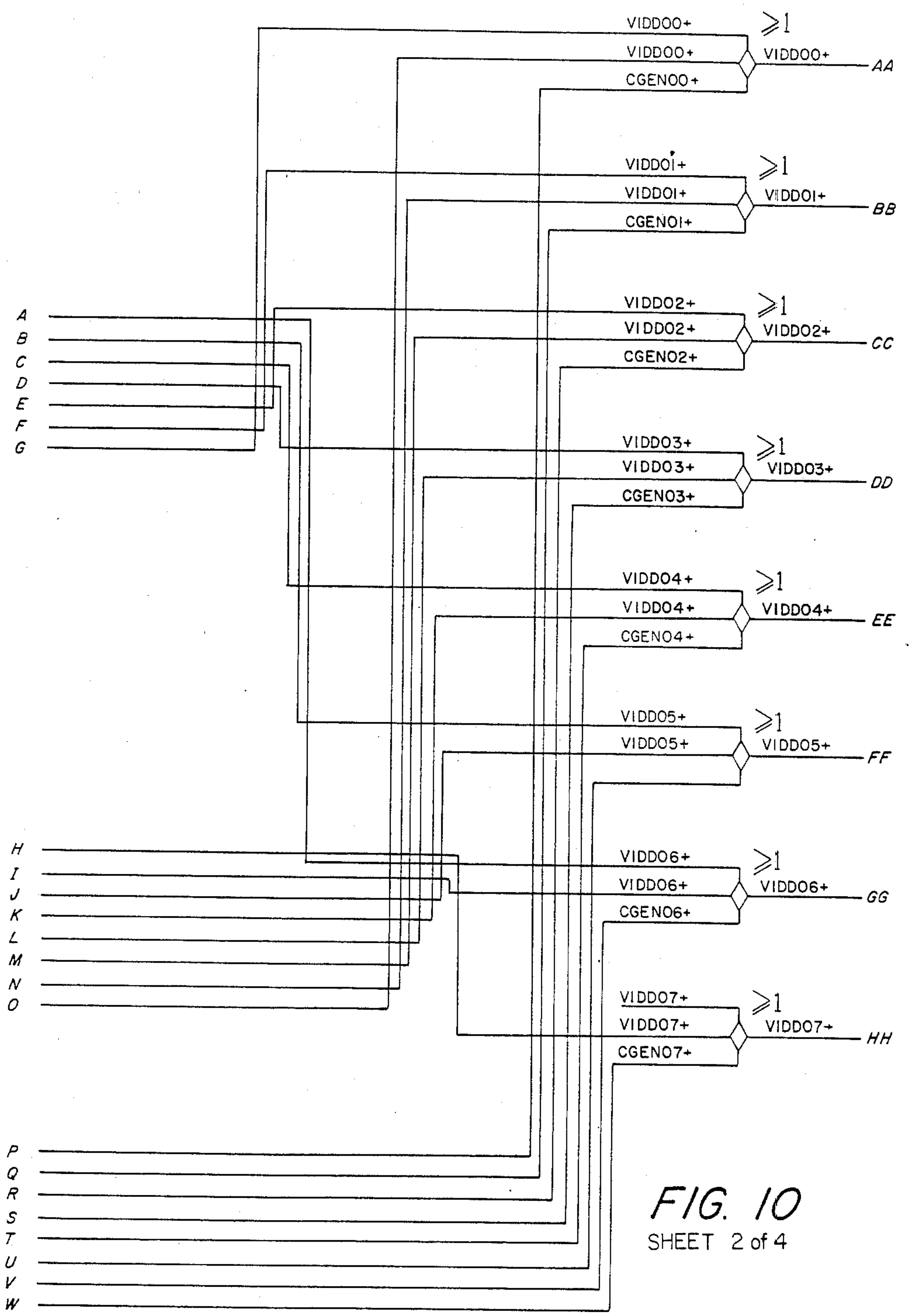
Figure 10:
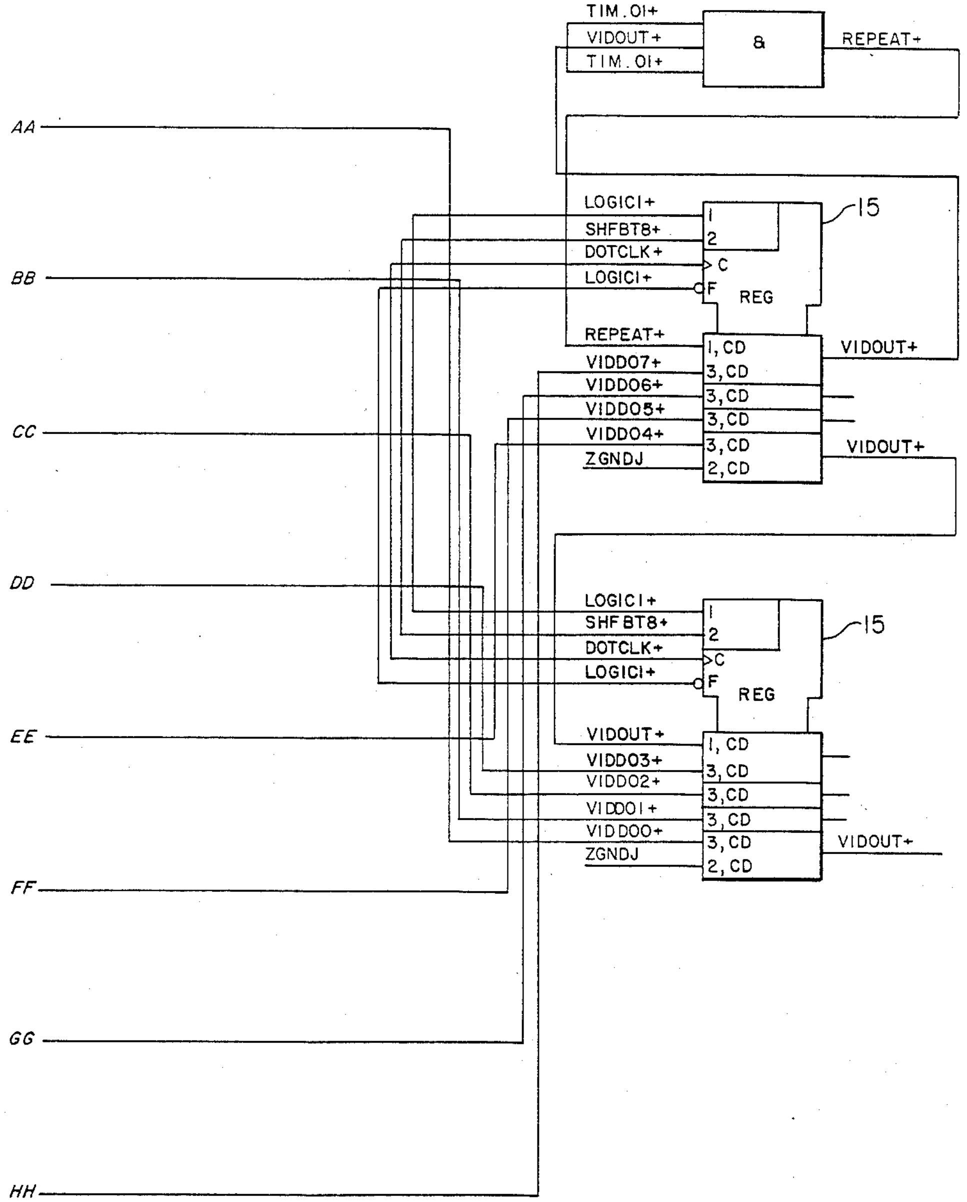
Figure 10:
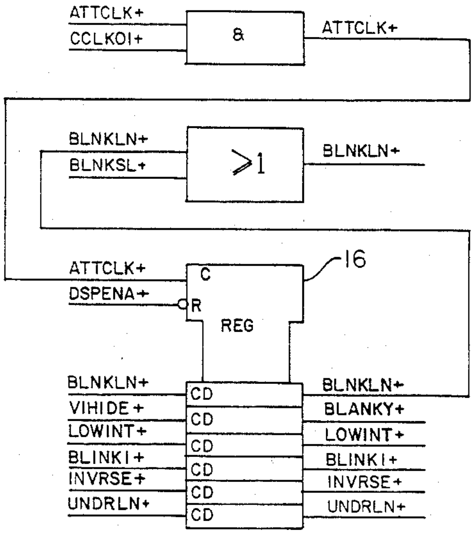

Referring to FIGS. 8, 9 and 10, there are shown detailed logic block diagrams of the invention of FIG. 7. It should be noted that elements on FIGS. 8, 9 or 10 that correspond to similar elements of FIG. 7 have been identified by the same reference numeral. Thus, the character generator of FIG. 7, having reference numeral 14, is also identified by reference numeral 14 on FIG. 10.

Referring now to FIG. 9, screen data buffer 7 and screen attribute buffer 8 coupled together comprise the 2K×16 screen buffer. Data from the 8-bit data bus 2, shown on FIG. 7, is applied to data bus leads DBUS00 through DBUS07 of both transceivers 9 and 10. Screen buffer data signals SBDAT0–SBDAT7 on transceiver 10 are applied to the SBDAT0–SBDAT7 terminals of screen data buffer 7 when data is being transmitted from the bus to be written into the screen data buffer 7. In a reverse manner, data from screen data buffer 7 can be read out onto bus 2 via transceiver 10. In a similar manner, data representing attributes can be written into or read out of the screen attribute buffer 8, and to or from the bus 2 via the data bus terminals DBUS00 through DBUS07 and screen buffer attribute terminals SBAT0 through SBAT7 of transceiver 9. In transferring information into or out of the screen buffer memories 7 and 8, it is transmitted to or from locations addressed by signals on terminals SBAD09 through SBAD19. Additionally the write enable signal WESBAT or WESBDT of screen buffer attribute 8 or screen data buffer 7 must be true. This technique of using unique write enable signals to select one or the other memory permits the screen data buffer to be stored in one memory bank; whereas the screen buffer attributes are stored in another memory bank.

When it is desired to generate a character, the information in screen data buffers 7 or 8 is read out into registers 11 and 12 in synchronism with the scan line time intervals. It will be seen, therefore, that screen buffer data on terminals SBDAT0 through SBDAT7 will be applied to the SBDAT0–SBDAT7 terminals of register 11. In a similar manner, data from screen attribute buffer 8 is applied to register 12. The information in register 11, for example, is the character code required for that particular time interval. This character code is applied to the CCODE0 through CCODE7 terminals of the character generator 14. Additionally the raster scan line address signals on terminals RASTR1 through RASTR4 of CRT controller 3 are applied to the character generator 14 on raster scan address line terminals RASTR1 through RASTR4 of character generator 14. Accordingly as raster scan lines 0–11 are addressed, and as each character is presented to the character generator in synchronism with the scan line time intervals, the character generator 14 decodes a portion of the character and provides video output signals on terminals VIDD00 through VIDD07 of shift registers 15 on sheet 3 of FIG. 7 via lines VIDD00–VID07 of sheet 2 of FIG. 7. These signals are input in parallel and are shifted out serially on terminal VIDOUT.

Referring now to FIG. 8, the CRT Controller (CRTC) 3 generates all of the timing for the display. This consists of the screen buffer address sequence emitted on terminals CRTA09–CRTA19, the raster scan line number sequence emitted on terminals RASTR1–RASTR4, as well as the horizontal and vertical synchronizing signals HSYNC1 and VSYNC2 and the display enable signal DISPLY. The CRTC 3 is capable of being "programmed"; i.e., being loaded with control parameters by virtue of having the signals UDATA0–UDATA7 from data bus 2 applied to its data terminals and suitable control signals being applied, such as UBUSRD·PHAS.E, ABUS18 and CRTCCS. The multiplexors (MUX) 6 are for the purpose of selecting an address for the screen buffer RAMs, from either the CRTC 3 or from the address bus 1. The former case is selected during (a portion of) every display character time to allow for reading out of the coded display data and attributes; while the latter case is selected under control of the microprocessor 20 when it is caused to write into or read out from the screen buffer for the purpose of causing the information to be displayed to be properly stored in the screen buffer. (The specifications for the controllers, such as the CRT controller are to be found in the Motorola Semiconductor Catalog beginning at 4–457; while the specifications for other elements are to be found in the Texas Instrument TTL Data Book for Design Engineers, Second Edition.)

Having described the invention so that a person of ordinary skill in the art can make and use it without undue experimentation, those skilled in the art will realize that many variations and modifications can be made to produce the described invention and still be within the spirit and scope of the claimed invention. Thus, some of the hardware and/or steps may be altered or replaced by different hardware and/or steps which will provide the same result and fall within the spirit of the claimed invention. It is the intent, therefore, that the invention be limited only as indicated by the scope of all the claims.

I claim:

1. A high definition bit-mapped page display system utilizing a shaped beam and aperture comprising:

(a) first means for generating shaped electron beams in a cathode ray tube (CRT) wherein said first means further comprise a CRT tube having at least one cathode, and a heater for each cathode, a focusing electrode, an anode, and a CRT screen coated with a material sensitive to electron impingement; a biasing grid for controlling beam strength, said biasing grid split to comprise at least two sections, each section having a small hole for permitting electrons to pass therethrough, the electrons through the holes forming separate beams individually controllable to be scanned across the screen in adjacent raster scan lines and optically combined on the screen in forming each character; an accelerator for accelerating electrons and having an oblong opening for permitting electrons that pass through the holes in said biasing grid to also pass through the oblong opening in said accelerator; shaping means for shaping the emitted electrons to a predetermined shape; and blocking means having an aperture operative for selectively blocking all or a portion of the shaped beam from passing through, with portions of the beam passing through separate portions of the aperture forming adjacent raster scan lines which are optically combined on the screen in forming each character;

(b) second means for generating bit patterns for said shaped electron means, said second means being character generators typically comprising read only memories (ROMs), programmable read only memories (PROMs), or erasable programmable read only memories (EPROMs); and, (c) third means coupled to said second and first means for controlling said shaped beams.

2. The high definition bit-mapped page display system as recited in claim 1 including refresh-memory means coupled to said second means for storing signals for refreshing said CRT screen.

3. The high definition bit-mapped page display system as recited in claim 2 including memory-data register means coupled to said refresh-memory means for storing selected addresses from said refresh-memory means.

4. The high definition bit-mapped page display system as recited in claim 3 wherein said third means includes a plurality of shift register means coupled to said data-memory-register means for generating a plurality of bits for controlling said shaped beam deflection.

5. The high definition bit-mapped page display system as recited in claim 4 including multiplexer means for selectively coupling said shift-register means to said memory-data register means.

6. The high definition bit-mapped page display system as recited in claim 5 further including bit-pair generating means coupled to said shift register means and to said shaped electron beams for generating bit-pairs, each bit-pair for controlling the deflection of the shaped electron beam in the X or Y direction.

7. The high definition bit-mapped page display system as recited in claim 6 further including X-deflecting means coupled to said bit-pair generating means and to said shaped electron beams for deflecting the shaped electron beam in the X-direction.

8. The high definition bit-mapped page display system as recited in claim 6 further including Y-deflection means coupled to said bit-pair generating means and to said shaped electron bem for deflecting the shaped electron beam in the Y-direction.

9. The high definition bit-mapped page display system as recited in claim 8 wherein selected ones of the bit-pairs control the magnitude of the deflection in the X or Y direction.

10. The high definition bit-mapped page display system as recited in claim 7 wherein the shaped electron beam is deflected in accordance to the following:

| BIT-PAIR | DIRECTION OF DEFLECTION AND MAGNITUDE |
|---|---|
| 01 | deflect one step negative, i.e., in the direction of (−X); |
| 10 | no deflection; |
| 11 | direct deflect one step positive, i.e., in the direction of (+X). |

11. The high definition bit-mapped page display system as recited in claim 10 wherein the shaped electron beam is deflected in the Y direction according to the following:

| BIT-PAIR | DIRECTION OF DEFLECTION |
|---|---|
| 01 | deflect one step negative, i.e., in the direction of (−Y); |
| 10 | no deflection; |
| 11 | deflect one step positive, i.e., in the direction of (+Y). |

* * * * *